(12) United States Patent
Park

(10) Patent No.: US 10,927,702 B1
(45) Date of Patent: Feb. 23, 2021

(54) TURBOCHARGER OR TURBOCHARGER COMPONENT

(71) Applicant: Savant Holdings LLC, South Jordan, UT (US)

(72) Inventor: Bret J. Park, South Jordan, UT (US)

(73) Assignee: Savant Holdings LLC, South Jordan, UT (US)

( * ) Notice: Subject to any disclaimer, the term of this patent is extended or adjusted under 35 U.S.C. 154(b) by 58 days.

(21) Appl. No.: 16/370,964

(22) Filed: Mar. 30, 2019

(51) Int. Cl.
*F01D 17/16* (2006.01)
*F02B 37/00* (2006.01)

(52) U.S. Cl.
CPC ............ *F01D 17/165* (2013.01); *F02B 37/00* (2013.01); *F05D 2240/128* (2013.01)

(58) Field of Classification Search
CPC ... F01D 17/165; F02B 37/00; F05D 2240/128
USPC ........................................................ 416/160
See application file for complete search history.

(56) References Cited

U.S. PATENT DOCUMENTS

| 3,232,581 | A |   | 2/1966 | Swearingen |
| 4,643,640 | A | * | 2/1987 | Burdette .............. F01D 17/165 415/164 |
| 4,654,941 | A | * | 4/1987 | Burdette ................ F02B 37/24 29/889.22 |
| 4,657,476 | A |   | 4/1987 | Berg |
| 4,659,295 | A | * | 4/1987 | Burdette .............. F01D 17/165 417/407 |
| 4,676,717 | A |   | 6/1987 | Willyard, Jr. |
| 4,804,316 | A | * | 2/1989 | Fleury .................... F02B 37/24 417/407 |
| D368,269 | S |   | 3/1996 | Chapman |
| D413,122 | S |   | 8/1999 | Chapman |
| 5,996,347 | A |   | 12/1999 | Nagae |
| 6,269,642 | B1 |   | 8/2001 | Arnold |
| 6,419,464 | B1 |   | 7/2002 | Arnold |
| 6,461,105 | B1 |   | 10/2002 | Nicolson |
| 6,736,595 | B2 |   | 5/2004 | Jinnai |
| 6,925,806 | B1 |   | 8/2005 | Zollinger |

(Continued)

FOREIGN PATENT DOCUMENTS

CN 105715312 6/2016
DE 112013005166 7/2015

(Continued)

OTHER PUBLICATIONS

U.S. Appl. No. 29/667,151, filed Oct. 18, 2018, Park.

(Continued)

*Primary Examiner* — J. Todd Newton
*Assistant Examiner* — Sabbir Hasan
(74) *Attorney, Agent, or Firm* — Austin Rapp

(57) ABSTRACT

A turbocharger or turbocharger component is disclosed herein. The turbocharger or turbocharger component may comprise an annular unison ring, and a first nozzle ring having an annular groove. The annular unison ring may be rotatably disposed in the annular groove. A partial circular recess may be disposed in an outer annular nozzle ring surface of the first nozzle ring adjacent to the annular groove. A unison crank having a circular body may be rotatably disposed in the partial circular recess. A plurality of vane assemblies may be rotatably disposed in a respective vane aperture within the first nozzle ring.

8 Claims, 23 Drawing Sheets

(56) References Cited

U.S. PATENT DOCUMENTS

| | | | |
|---|---|---|---|
| 6,951,450 B1 | 10/2005 | Figura | |
| 7,255,530 B2 | 8/2007 | Vogiatzis | |
| 7,509,804 B2 | 3/2009 | Kobayashi | |
| 7,559,199 B2 | 7/2009 | Sausse | |
| D616,902 S | 6/2010 | Foreman | |
| 8,573,930 B2 * | 11/2013 | Woo | F01D 17/165 415/163 |
| 8,985,943 B2 | 3/2015 | Groves | |
| 9,017,017 B2 * | 4/2015 | Sausse | F01D 17/165 415/160 |
| D740,327 S | 10/2015 | Naruoka | |
| 9,429,033 B2 * | 8/2016 | Martin | F01D 17/16 |
| D767,637 S | 9/2016 | Pappathopoulos | |
| D786,549 S | 5/2017 | Dandachli | |
| D791,840 S | 7/2017 | Gebert | |
| 10,087,820 B2 | 10/2018 | Uesugi | |
| 10,145,267 B2 | 12/2018 | Yokoyama | |
| 10,161,305 B2 | 12/2018 | Ikegami | |
| 10,247,037 B2 | 4/2019 | Ogata | |
| D857,186 S | 8/2019 | Dandachli | |
| 10,458,315 B2 | 10/2019 | Isogai | |
| 10,508,659 B2 | 12/2019 | Jin | |
| 10,590,835 B2 | 3/2020 | Boehn | |
| 2004/0081567 A1 | 4/2004 | Boening | |
| 2005/0017709 A1 | 1/2005 | Stolfus | |
| 2007/0130943 A1 | 6/2007 | Sausse | |
| 2008/0260520 A1 | 10/2008 | Hettinger | |
| 2008/0304960 A1 | 12/2008 | Cvjeticanin | |
| 2009/0053051 A1 | 2/2009 | Cvjeticanin | |
| 2009/0060727 A1 | 3/2009 | Moss | |
| 2009/0123272 A1 | 5/2009 | Love | |
| 2011/0110768 A1 | 5/2011 | Nikolic | |
| 2012/0279217 A1 | 11/2012 | Eriksson | |
| 2013/0084161 A1 | 4/2013 | Groves | |
| 2013/0272889 A1 | 10/2013 | Cornell | |
| 2014/0056699 A1 | 2/2014 | Cornelius | |
| 2014/0093364 A1 | 4/2014 | Narehood | |
| 2014/0133970 A1 | 5/2014 | Groves | |
| 2015/0322849 A1 | 11/2015 | Ward | |
| 2015/0361990 A1 | 12/2015 | Rodrigues | |
| 2017/0107993 A1 | 4/2017 | Colson | |
| 2017/0191492 A1 | 7/2017 | Annati | |
| 2017/0191496 A1 | 7/2017 | Harley | |
| 2017/0204867 A1 | 7/2017 | Beers | |
| 2017/0211467 A1 | 7/2017 | Hall | |
| 2017/0234325 A1 | 8/2017 | Prater | |
| 2017/0292441 A1 | 10/2017 | Jin | |
| 2018/0058247 A1 | 3/2018 | Karamavruc | |
| 2018/0119703 A1 | 5/2018 | Gashi | |
| 2018/0171825 A1 | 6/2018 | Hossbach | |
| 2018/0306104 A1 | 10/2018 | Gerard | |
| 2018/0372116 A1 | 12/2018 | Nandagopal | |
| 2019/0178151 A1 | 6/2019 | Smith | |
| 2019/0264604 A1 | 8/2019 | Lombard | |
| 2019/0264710 A1 | 8/2019 | Mohtar | |
| 2019/0331129 A1 | 10/2019 | Zimmerman | |
| 2020/0141310 A1 | 5/2020 | Kuenstner | |

FOREIGN PATENT DOCUMENTS

| | | |
|---|---|---|
| DE | 112014000758 | 10/2015 |
| DE | 112015004613 | 6/2017 |
| EP | 0226444 | 6/1987 |
| EP | 1357255 | 10/2003 |
| EP | 1418311 | 5/2004 |
| EP | 1564380 | 8/2005 |
| GB | 2400633 | 10/2004 |
| JP | 2009062840 | 3/2009 |
| JP | 2010169101 | 8/2010 |
| JP | 2011021576 | 2/2011 |
| JP | 2014034910 | 2/2014 |
| JP | 2015113826 | 6/2015 |
| JP | 2016156321 | 9/2016 |
| JP | 6001707 | 10/2016 |
| JP | 6187227 | 8/2017 |
| KR | 101484415 | 1/2015 |
| KR | 20150003838 | 1/2015 |
| WO | 2008118833 | 10/2008 |
| WO | 2017048568 | 3/2017 |

OTHER PUBLICATIONS

U.S. Appl. No. 29/667,153, filed Oct. 18, 2018, Park.
U.S. Appl. No. 29/682,180, filed Mar. 1, 2019, Park.
Office Action Response, U.S. Appl. No. 29/682,180, filed Aug. 17, 2020 (shown in attachment 5).
U.S. Appl. No. 29/724,935, filed Feb. 20, 2020, Park.
Notice of Allowance and Fee(s) Due (including a Notice of Allowability for a Design Application section, a Continuation Sheet of Acceptable drawing), U.S. Appl. No. 29/682,180, dated Sep. 8, 2020 (shown in attachment 6).
Office Action, U.S. Appl. No. 29/682,180, dated Jun. 12, 2020 (shown in attachment 1).
Notice of Allowance and Fee(s) Due (including a Notice of Allowability for a Design Application section, an Examiner's Amendment section, and an Amendment to the Specification section), U.S. Appl. No. 29/724,935, dated Jul. 8, 2020 (shown in attachment 2).
Turbo Lab, Turbo Lab America Holset HX40 60mm Billet Compressor Wheel and Housing, apparently sold or offered for sale at least by Apr. 6, 2015, retrieved from the Internet on Jun. 3, 2020 from URL: <https://www.amazon.com/Turbo-Lab-America-Compressor-Housing/dp/B00M9NJIOU> (shown in attachment 3).
Amendment After Allowance, U.S. Appl. No. 29/724,935, filed Aug. 14, 2020 (shown in attachment 1).

* cited by examiner

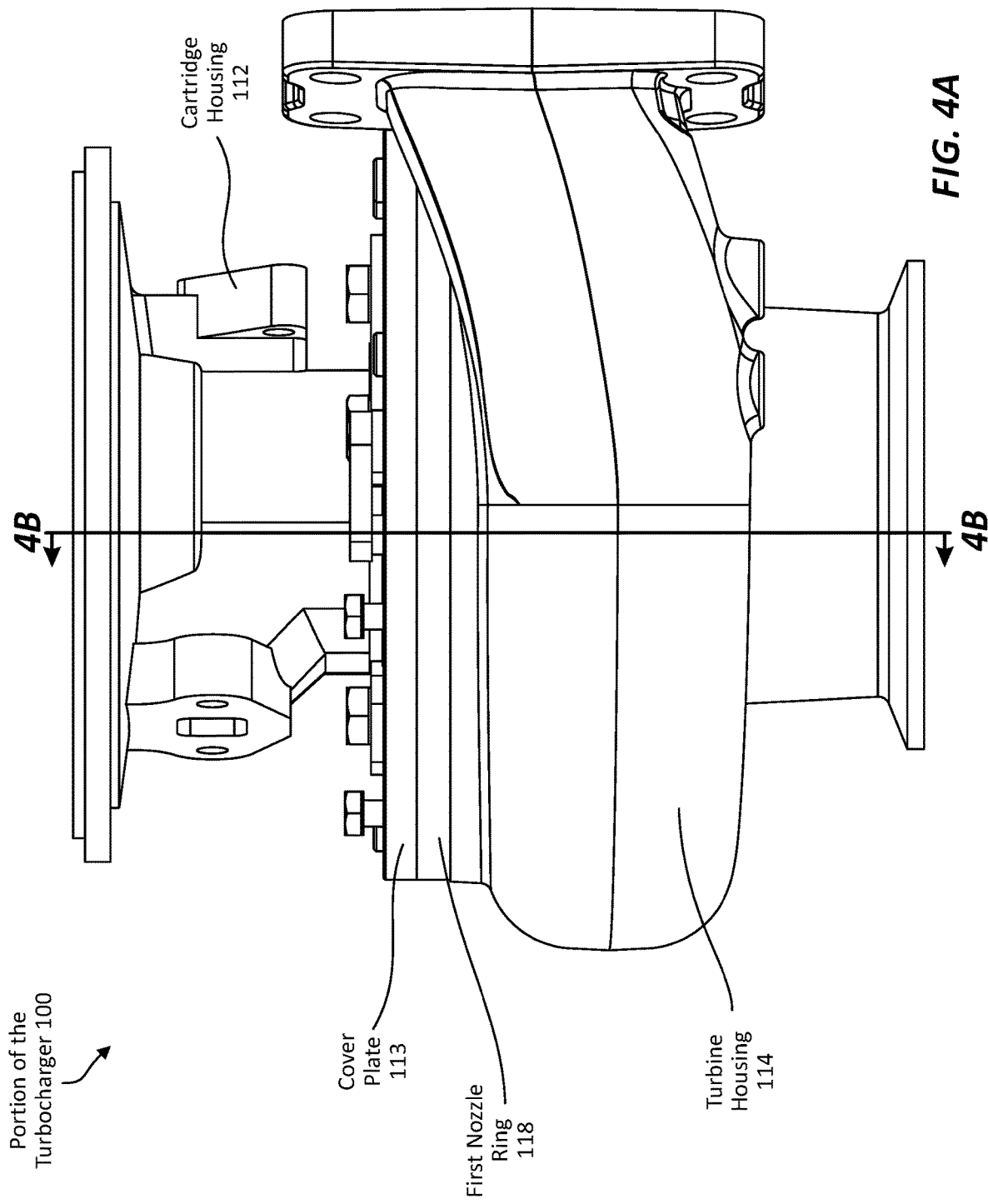

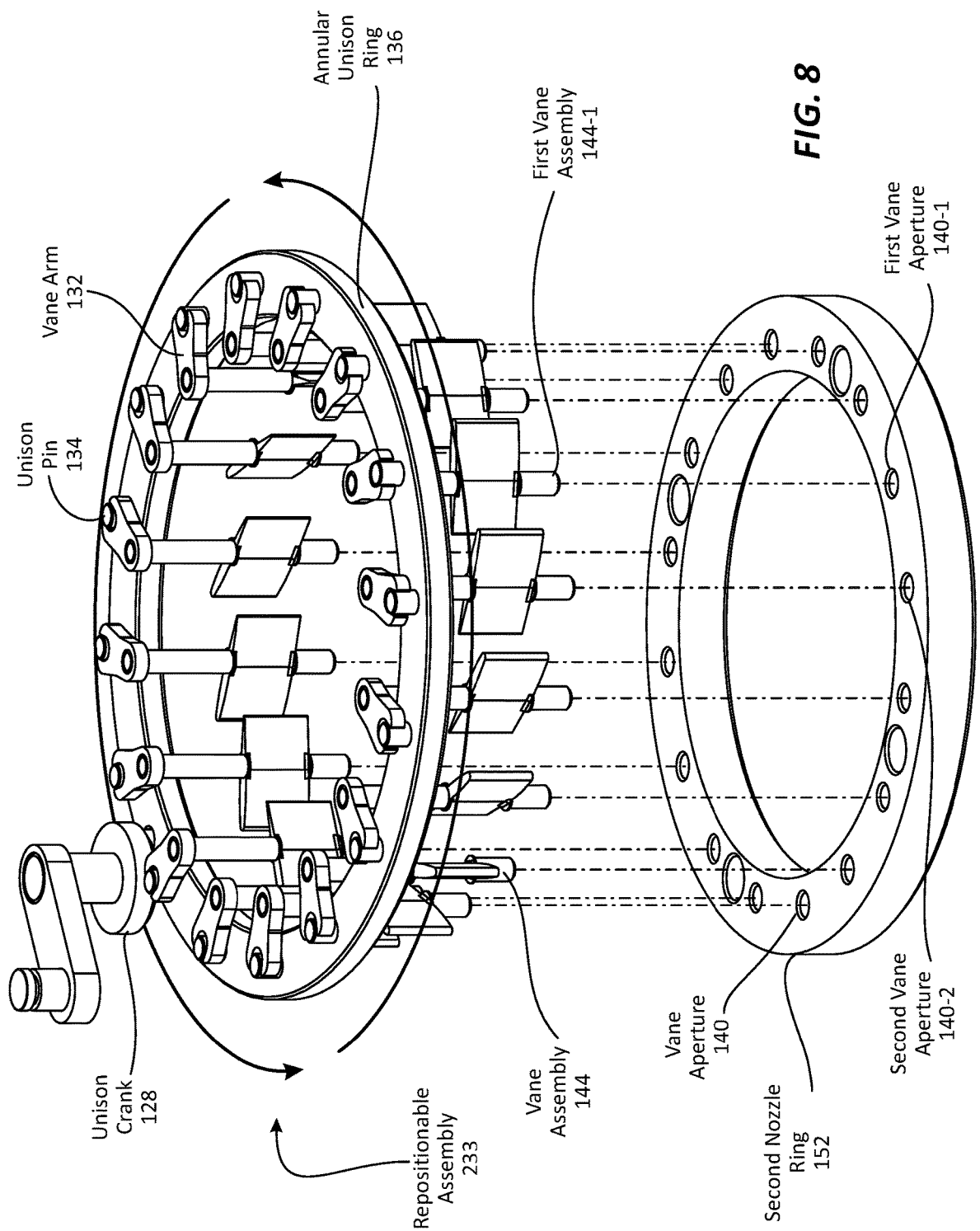

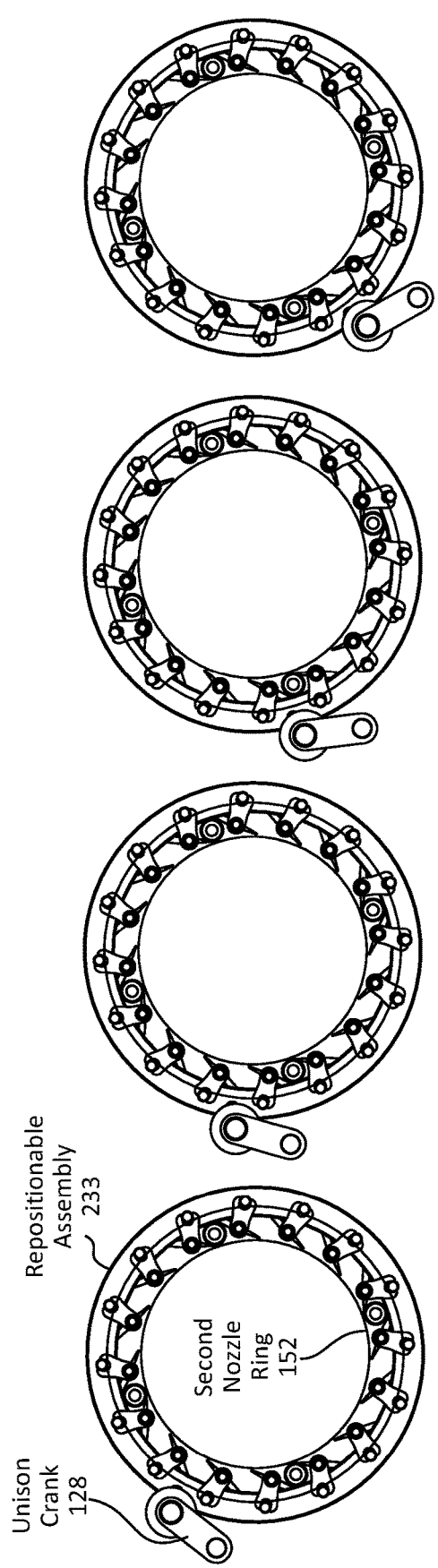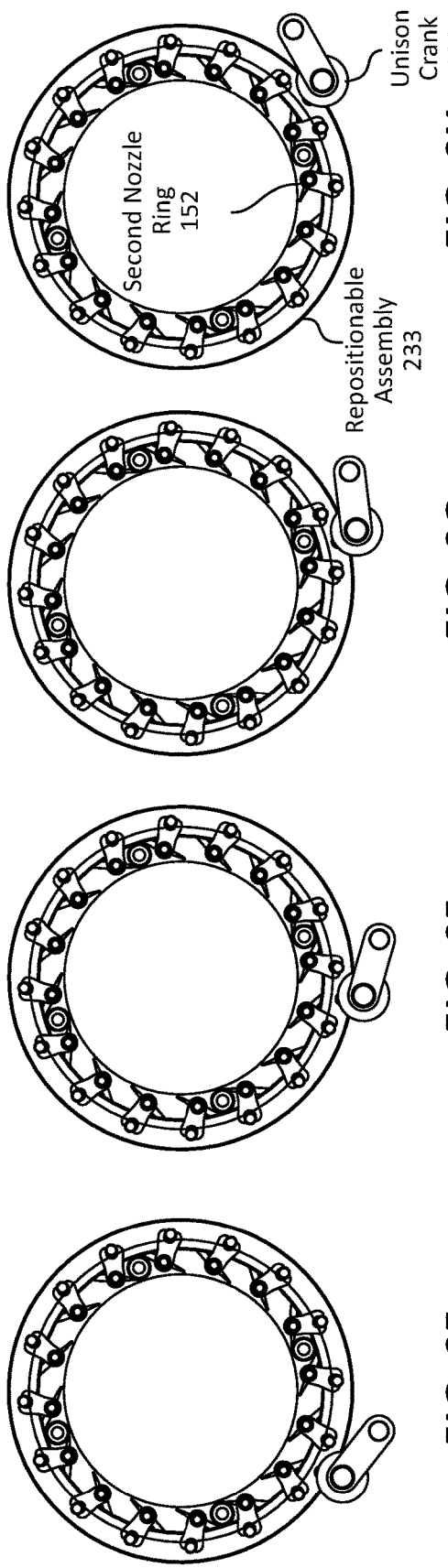

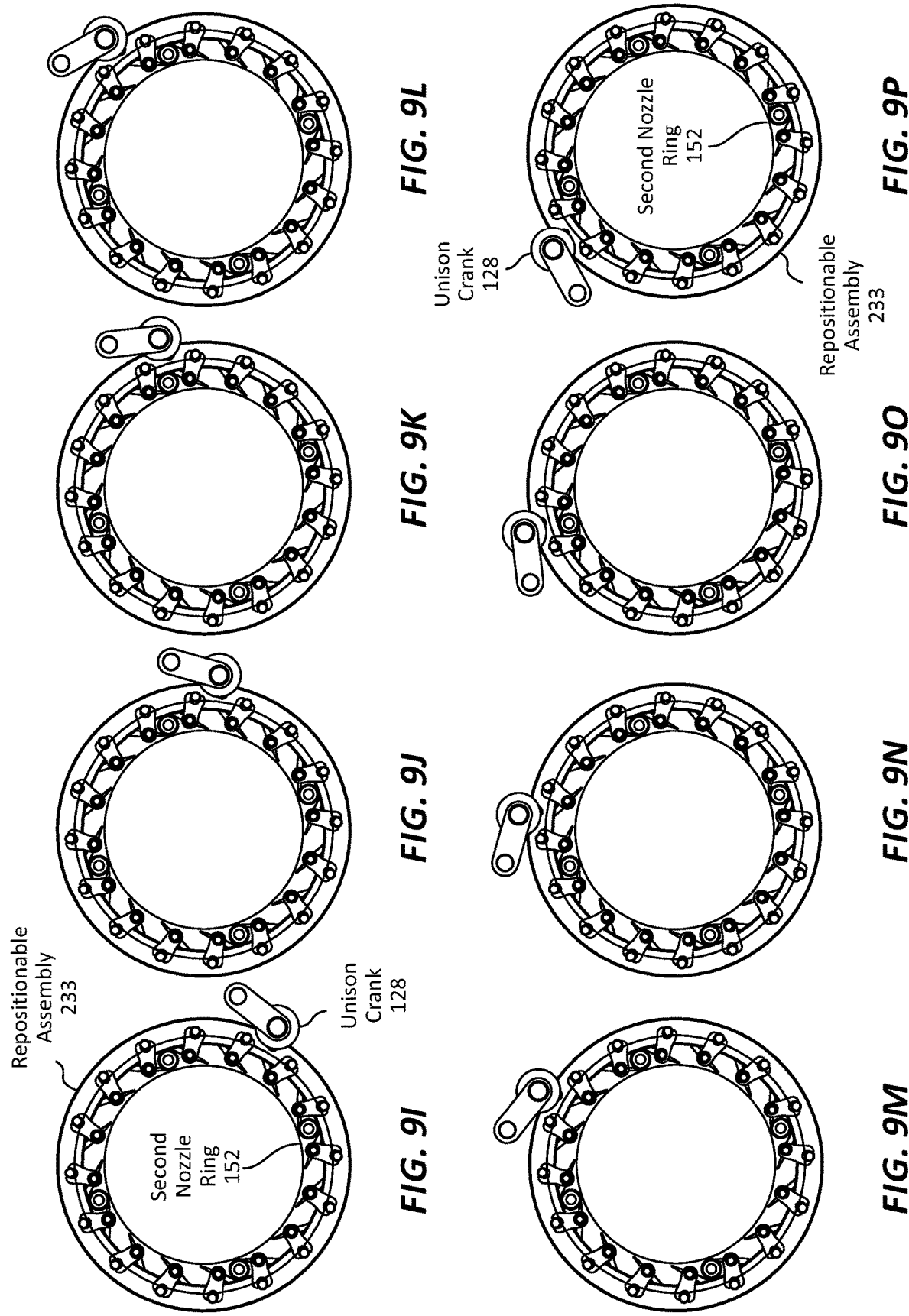

TURBOCHARGER OR TURBOCHARGER COMPONENT

TECHNICAL FIELD

The present invention relates to turbochargers or a component of a turbocharger.

BACKGROUND

While turbochargers have been available for some time, improvements are still desirable. For example, adjustment of the position of the turbocharger to accommodate different spaces may be desirable. It may also desirable to have a turbocharger component that may interface with different types and styles of cartridge housings. It may also desirable that a more robust and universal design is available. For one or more of the foregoing reasons and/or various other reasons, an improved turbocharger is desirable.

SUMMARY

Embodiments of the disclosed subject matter are provided below for illustrative purposes and are in no way limiting of the claimed subject matter.

A turbocharger or turbocharger component comprising a length dimension and a width dimension is disclosed. The turbocharger or turbocharger component may comprise an annular unison ring. The turbocharger or turbocharger component may comprise a first nozzle ring having an outer annular nozzle ring surface, an annular groove, and an inner annular nozzle ring surface on a first side of the first nozzle ring. The annular groove may comprise an outer circular wall, an inner circular wall, and a recessed annular surface with the recessed annular surface being offset from the outer annular nozzle ring surface along the length dimension. The recessed annular surface may be disposed intermediate the outer circular wall and the inner circular wall with the annular groove shaped and sized to receive the annular unison ring such that the annular unison ring is rotatably disposed in the annular groove.

The turbocharger or turbocharger component may also comprise a plurality of vane apertures extending through the first nozzle ring from the inner annular nozzle ring surface to an opposite annular ring surface disposed on a second side of the first nozzle ring. A partial circular recess may be disposed in the outer annular nozzle ring surface and may be adjacent to the annular groove. A plurality of unison pins may extend away from a first unison ring surface of the annular unison ring. A slot may be disposed in the annular unison ring.

The turbocharger or turbocharger component may comprise a plurality of vane assemblies with each vane assembly comprising a proximal shaft, a distal shaft, and a vane. The proximal shaft and the distal shaft may extend along a common longitudinal axis with the vane disposed intermediate the proximal shaft and the distal shaft. Each vane may comprise a first wing and a second wing.

The turbocharger or turbocharger component may comprise a unison crank having a circular body having a first side and a second side with the first side of the unison crank being opposite the second side of the unison crank. A centrally located central pin may extend from the first side of the unison crank, and an eccentric pin may extend from the second side of the unison crank.

The turbocharger or turbocharger component may comprise the partial circular recess being shaped and sized to receive the circular body of the unison crank such that the unison crank is rotatably disposed in the partial circular recess. The eccentric pin may be disposed in the slot such that rotation of the unison crank causes the annular unison ring to rotate within the annular groove.

The turbocharger or turbocharger component may comprise the plurality of vane apertures being shaped and sized to receive one of the proximal shafts of the plurality of vane assemblies such that each vane assembly is rotatably disposed in a respective vane aperture about a respective common longitudinal axis.

The turbocharger or turbocharger component may comprise a plurality of vane arms with each vane arm having a first end and a second end. Each first end may be slidably attached to one of the plurality of unison pins of the annular unison ring, and second end may be fixedly attached to the proximal shaft of one of the vane assemblies such that rotation of the annular unison ring causes each of the plurality of vane arms to pivot and the vane assemblies to rotate about each respective common longitudinal axis.

In various embodiments, the turbocharger or turbocharger component may comprise a second nozzle ring. The turbocharger or turbocharger component may include a turbine housing having a second annular groove comprising a second inner circular wall, a second outer circular wall, and a second recessed annular surface with the second annular recess surface between the second inner circular wall and the second outer circular wall. The second annular groove may be sized and shaped to receive the second nozzle ring. A plurality of fasteners may be disposed to removably fix the second nozzle ring at least partially within the second annular groove.

The second nozzle ring may comprise a plurality of secondary vane apertures with each secondary vane aperture sized and shaped to receive one of the distal shafts of the plurality of vane assemblies such that each distal shaft is rotatably disposed in a respective secondary vane aperture with the plurality of vanes disposed between the first nozzle ring and the second nozzle ring. The first nozzle ring may be repositionable and fixable at different rotational orientations with respect to the second nozzle ring.

The turbocharger or turbocharger component may further comprise a cover plate and a turbine housing, and the cover plate may be repositionable and fixable at different rotational orientations with respect to the turbine housing. In various embodiments, the second nozzle ring is repositionable and fixable at different rotational orientations within the second annular groove.

In various embodiments, the turbocharger or turbocharger component may further comprise a second nozzle ring with the second nozzle ring comprising a plurality of secondary vane apertures. Each secondary vane aperture sized and shaped to receive one of the distal shafts of the plurality of vane assemblies such that each distal shaft is rotatably disposed in a respective secondary vane aperture with the plurality of vanes disposed between the first nozzle ring and the second nozzle ring. The second nozzle ring may be integrally formed with a turbine housing.

In various embodiments, the turbocharger or turbocharger component may further comprise a cartridge housing comprising a first throat and a first lip disposed at a remote end of the first throat with the first lip having a greater width than the first throat, the first lip comprising a first peripheral engaging surface.

The turbocharger or turbocharger component may further comprise a cover plate securable to the first nozzle ring with the cover plate comprising a second throat and a second lip disposed at a remote end of the second throat, in which the second lip has a greater width than the first throat and the second lip comprises a second peripheral engaging surface.

The turbocharger or turbocharger component may further comprise a clamp comprising an inwardly engaging surface with the clamp having a narrow position. The inwardly engaging surface being shaped to simultaneously engage the first peripheral engaging surface and the second peripheral engaging surface to fix the first lip in an adjacent position with respect to the second lip in any rotational orientation of the cover plate with respect to the cartridge housing when the clamp is in the narrow position.

In various embodiments, the turbocharger or turbocharger component may comprise a cartridge housing comprising a first throat and a lip. The throat may have a throat width, and the lip may be disposed at a remote end of the first throat. The lip may have a lip width. The second lip width may be greater than the first throat width.

The turbocharger or turbocharger component may comprise a cover plate securable to the first nozzle ring with the cover plate comprising an opening for receiving the lip. The opening may have an opening width greater than or equal to the lip width.

The turbocharger or turbocharger component may comprise one or more inwardly projecting brackets securable to the cover plate in a secured position in which opposing inward edges of the one or more of the inwardly projecting brackets define a bracket width. The bracket width may be less than each of the opening width and the second lip width and may be greater or equal to the throat width.

BRIEF DESCRIPTION OF THE DRAWINGS

Various embodiments of the invention will become apparent from the following description and appended claims, taken in conjunction with the accompanying drawings. Understanding that these drawings depict only examples of the invention thereof and are, therefore, not to be considered limiting of the invention's scope, particular embodiments will be described with additional specificity and detail through use of the accompanying drawings in which:

FIG. 4A is a side elevational view of a portion of the embodiment of the turbocharger shown in FIG. 1;

FIG. 8 is a perspective view of one embodiment of a combination of an annular unison ring, a second nozzle ring, and a unison crank with a plurality of unison pins, vane arms, and vane assemblies with the second nozzle ring spaced apart from the vane assemblies;

FIGS. 9A-9P illustrate various embodiments of a unison crank at different rotational orientations with respect to the second nozzle ring;

Figure 1:
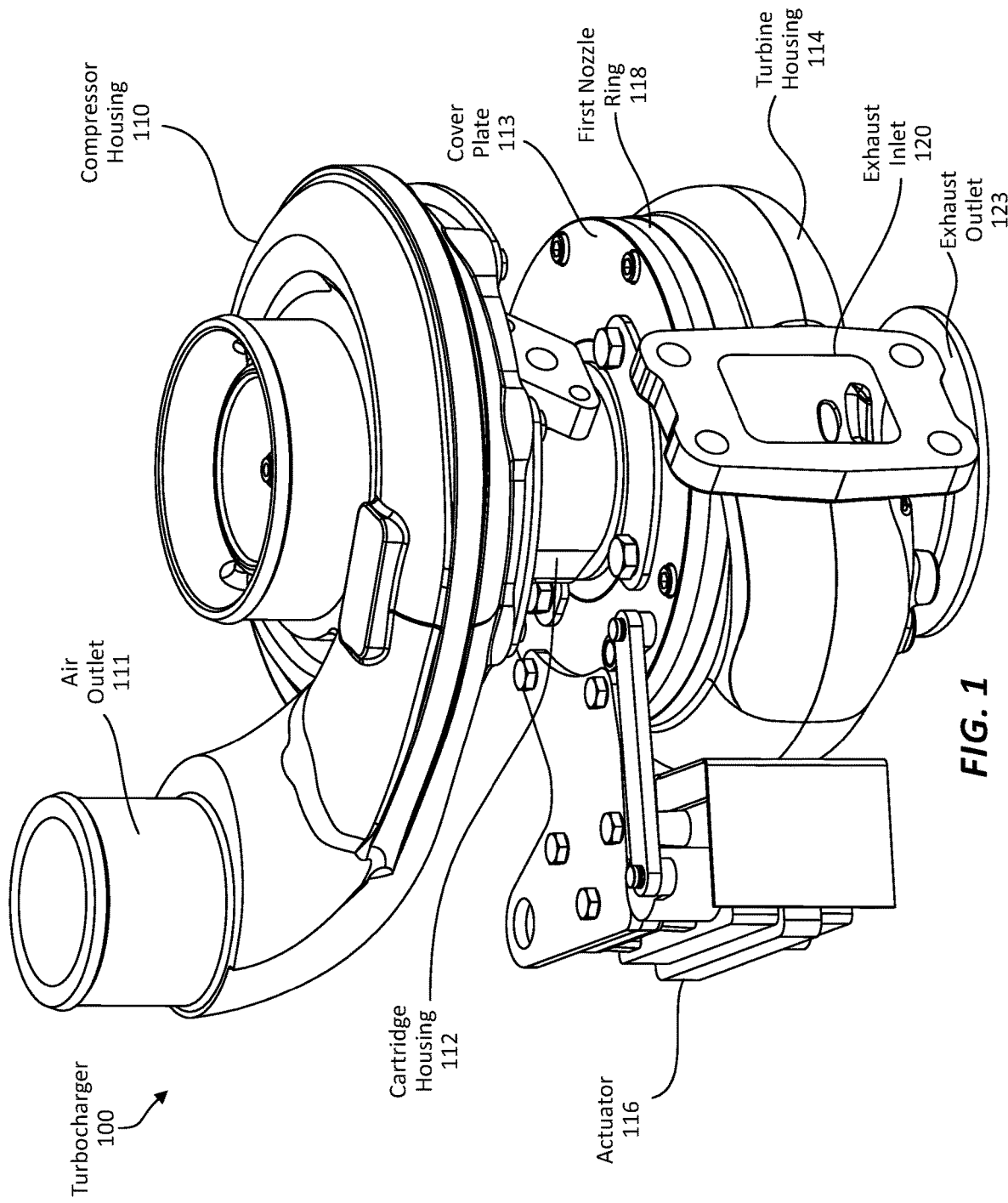
FIG. 1 is a perspective view of one embodiment of a turbocharger.

In accordance with common practice, the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the present disclosure are described below. It should be apparent that the teachings herein may be embodied in a wide variety of forms and that any specific structure, function, or both disclosed herein is merely representative. Based on the teachings herein, one skilled in the art should appreciate that an aspect disclosed herein may be implemented independently of any other aspects and that two or more of these aspects may be combined in various ways, even if that combination is not specifically illustrated in the figures. For example, an apparatus may be implemented, or a method may be practiced, using any number of the aspects set forth herein whether disclosed in connection with a method or an apparatus. Further, the disclosed apparatuses and methods may be practiced using structures or functionality known to one of skill in the art at the time this application was filed, although not specifically disclosed within the application.

By way of introduction, the following brief definitions are provided for various terms used in this application. Additional definitions will be provided in the context of the discussion of the figures herein. As used herein, "exemplary" can indicate an example, an implementation, and/or an aspect, and should not be construed as limiting or as indicating a preference or a preferred implementation. Further, it is to be appreciated that certain ordinal terms (e.g., "first" or "second") can be provided for identification and ease of reference and may not necessarily imply physical characteristics or ordering. Therefore, as used herein, an ordinal term (e.g., "first," "second," "third") used to modify an element, such as a structure, a component, an operation, etc., does not necessarily indicate priority or order of the element with respect to another element, but rather distinguishes the element from another element having a same name (but for use of the ordinal term). In addition, as used herein, indefinite articles ("a" and "an") can indicate "one or more" rather than "one." As used herein, a structure or operation that "comprises" or "includes" an element can include one or more other elements not explicitly recited. Thus, the terms "including," "comprising," "having," and variations thereof signify "including but not limited to" unless expressly specified otherwise. Further, an operation performed "based on" a condition or event can also be performed based on one or more other conditions or events not explicitly recited. As used in this application, the terms "an embodiment," "one embodiment," "another embodiment," or analogous language do not refer to a single variation of the disclosed subject matter; instead, this language refers to variations of the disclosed subject matter that can be applied and used with a number of different implementations of the disclosed subject matter. An enumerated listing of items does not imply that any or all of the items are mutually exclusive and/or mutually inclusive, unless expressly specified otherwise.

A reference numeral without a suffix (e.g., the suffix may comprise a lowercase letter or a hyphen followed by a number) may refer to one or more of a particular item, which may include a group of items. A reference numeral with a suffix comprising a hyphen followed by a number (e.g., 110-1, 110-2, 110-3, etc.) refers to a specific one of a group of items. In this case, the reference numeral without the suffix comprising a hyphen followed by a number refers to all of the items in the group, while, when reference is made to a specific one of the items, a suffix comprising a hyphen followed by a number will be utilized. When multiple items in a group are present in a single figure, not all such items may be labeled with a reference numeral to avoid the undue proliferation of reference numerals on the figure. In addition, it should be noted that the general reference number (i.e., the reference number without a suffix) may be used in the figure and in the specification to refer to the items in the group or a reference numeral with the suffix may be used to refer to a specific item in the group. A reference numeral with a suffix comprising a lowercase letter (e.g., 100a, 100b, 100c, etc.) refers to an item that is a variation of the item bearing the reference numeral without the suffix (i.e., similar but not identical to the item bearing the reference numeral without the suffix) and is also different than items with the same reference numeral but a different suffix.

For this application, the phrases "secured to," "connected to," "coupled to," and "in communication with" refer to any form of interaction between two or more entities, including mechanical, electrical, magnetic, electromagnetic, and thermal interaction and may also include integral formation. The phrase "attached to" refers to a form of mechanical coupling that restricts relative translation or rotation between the attached objects.

The phrase "attached directly to" refers to a form of attachment by which the attached items are either in direct contact, or are only separated by a single fastener, adhesive, or other attachment mechanisms. The term "abut" refers to items that are in direct physical contact with each other, although the items may be attached, secured, fused, or welded together. The term "integrally formed" refer to a body that is manufactured integrally, i.e., as a single piece, without requiring the assembly of multiple pieces. Multiple parts may be integrally formed with each other if they are formed from a single workpiece.

The phrase "substantially parallel," as used herein, signifies that the pertinent members, components, or items that are "substantially parallel" to each other are within 15° of being perfectly parallel to each other.

As used herein, in various embodiments, the term "offset" when used to identify a relative position of items, features or components along a designated axis, in various embodiments, signifies that the center points of each of the two identified items are offset along a particular axis.

As used herein, the terms "rotatably disposed in" or "rotatably disposed within" signifies that one component is partially or entirely disposed within the second component and the first and second components are mechanically engaged such that either the first or the second component may rotate with respect to the other component.

Figure 2:
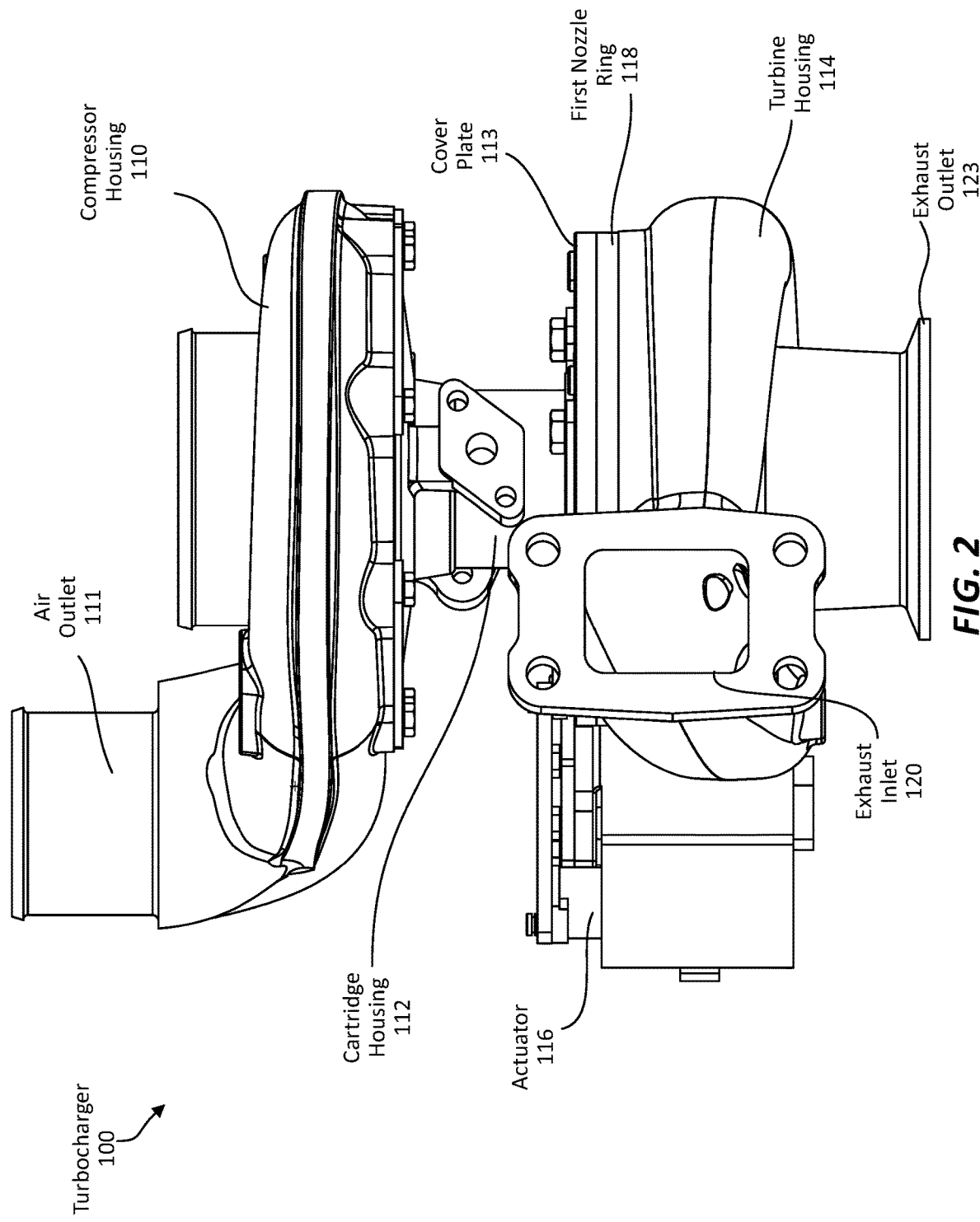
FIG. 2 is a side, elevational view of the embodiment of the turbocharger shown in FIG. 1.

FIG. 1 is a perspective view of one embodiment of a turbocharger 100, while FIG. 2 is a side, elevational view of the embodiment of the turbocharger 100 shown in FIG. 1. FIGS. 1-2 will be discussed concurrently. The turbocharger 100 may comprise a compressor housing 110 having an air outlet 111, a cartridge housing 112, a cover plate 113, a turbine housing 114 having an exhaust inlet 120, an exhaust outlet 123, a first nozzle ring 118, and an actuator 116.

Speaking broadly, the turbocharger 100 may be utilized, for example, to receive exhaust from an engine through the exhaust inlet 120 of the turbine housing 114 (with the exhaust exiting the turbine housing 114 through the exhaust outlet 123) and then provide pressurized air from the compressor housing 110 via the air outlet 111 to an intake manifold of the engine to increase the power output of the engine. As used herein, the term "exhaust" refers to air and/or particulate matter generated by operation of a combustion engine.

The cartridge housing 112 may be used to secure the compressor housing 110 to the turbine housing 114. Fasteners may be used to secure the cover plate 113 and first nozzle ring 118 to the turbine housing 114.

The actuator 116 may be employed to control a set of vane assemblies (illustrated and discussed subsequently) that regulate exhaust flow through the turbine housing 114.

It should be noted that the turbocharger 100 illustrated in FIGS. 1 and 2 serves as only one possible embodiment of the disclosed invention. For example, the shape and size of the compressor housing 110, cartridge housing 112, and turbine housing 114 may be varied within the scope of the disclosed subject matter. Also, various types of different actuators 116 may be utilized within the scope of the disclosed subject matter, such as electronic, pneumatic or hydraulic actuators.

Figure 3A:
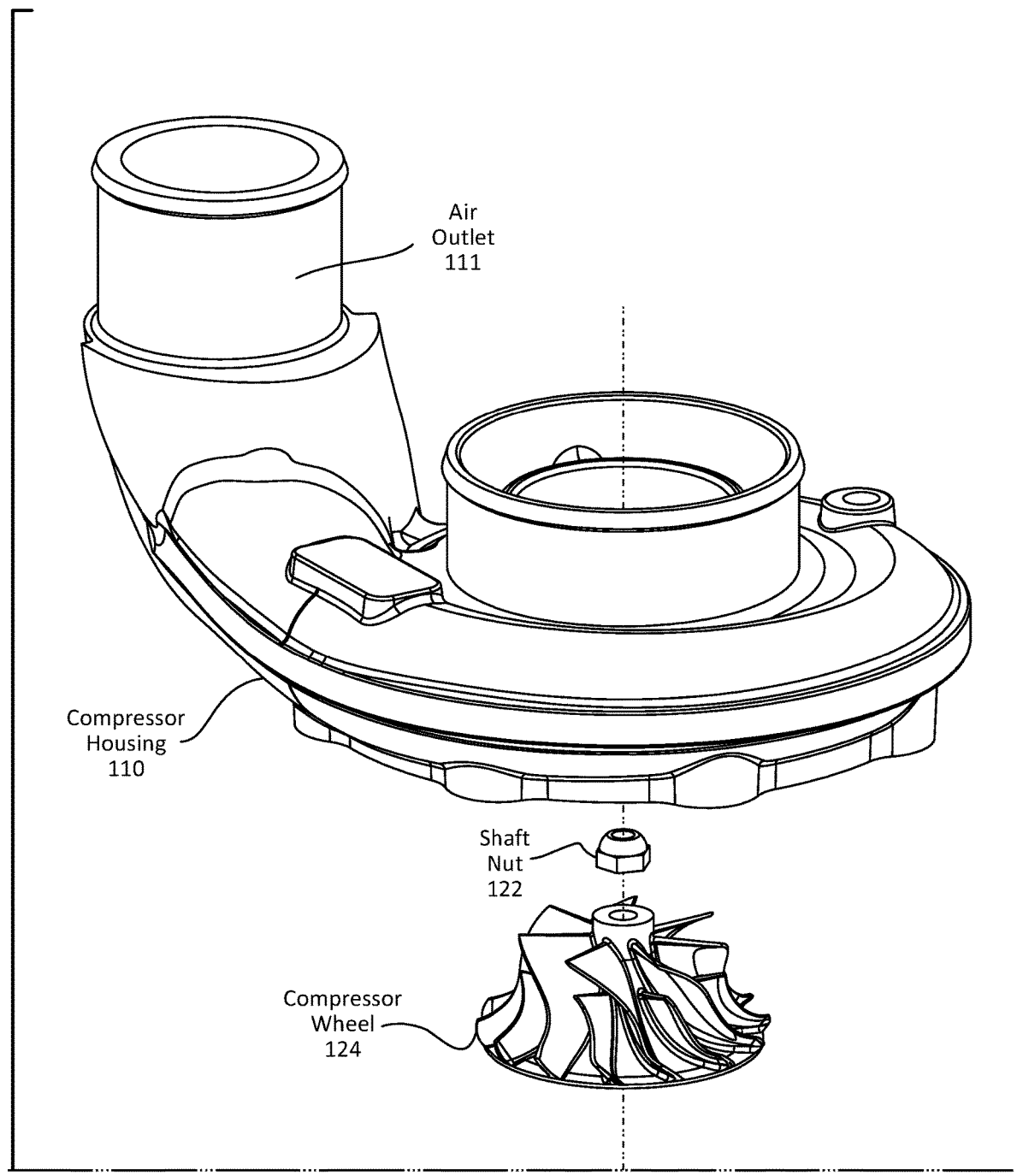
FIGS. 3A-3C jointly comprise a perspective, exploded view of the embodiment of the turbocharger shown in FIG. 1.
Figure 3B:
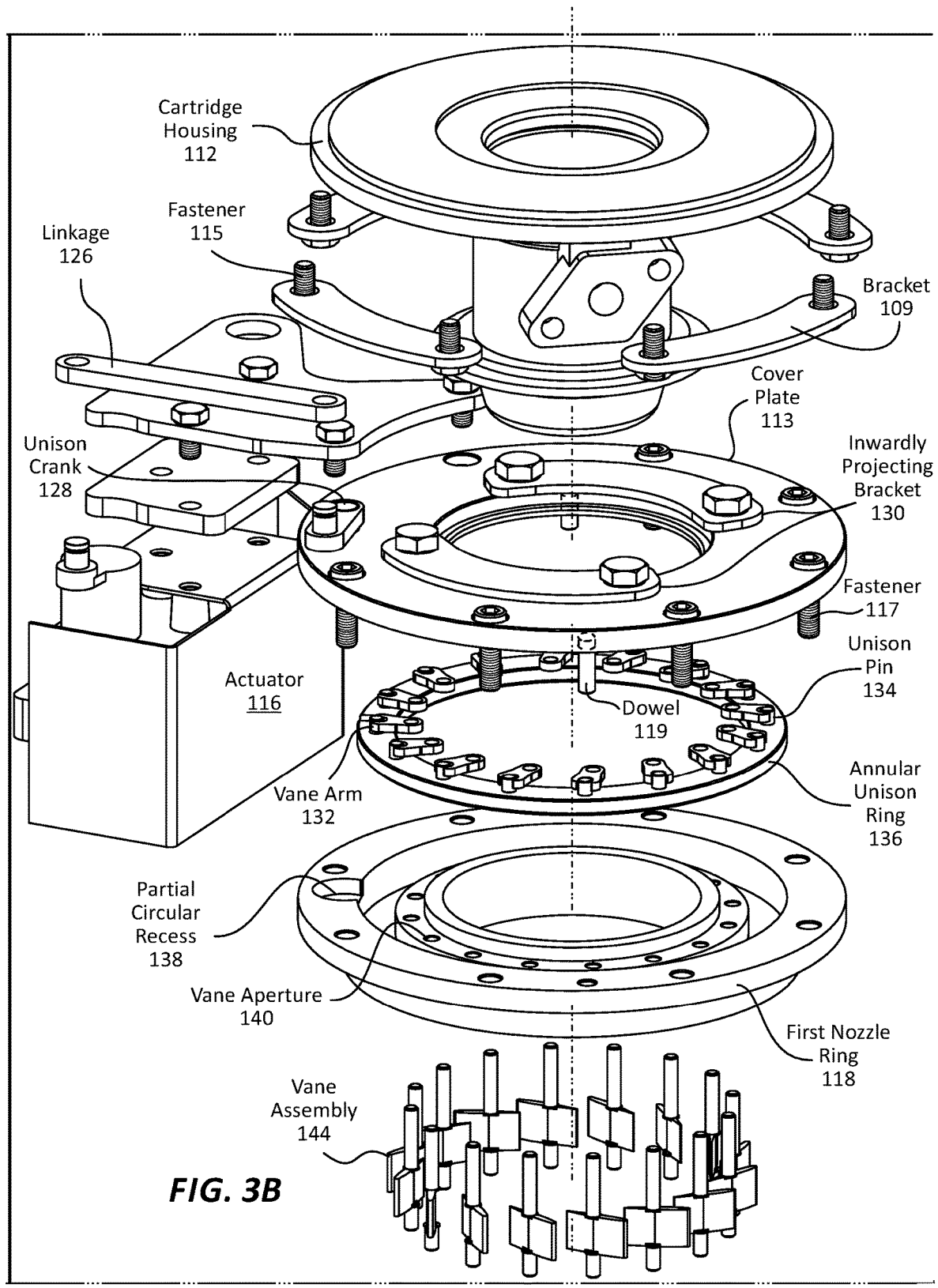
Figure 3C:
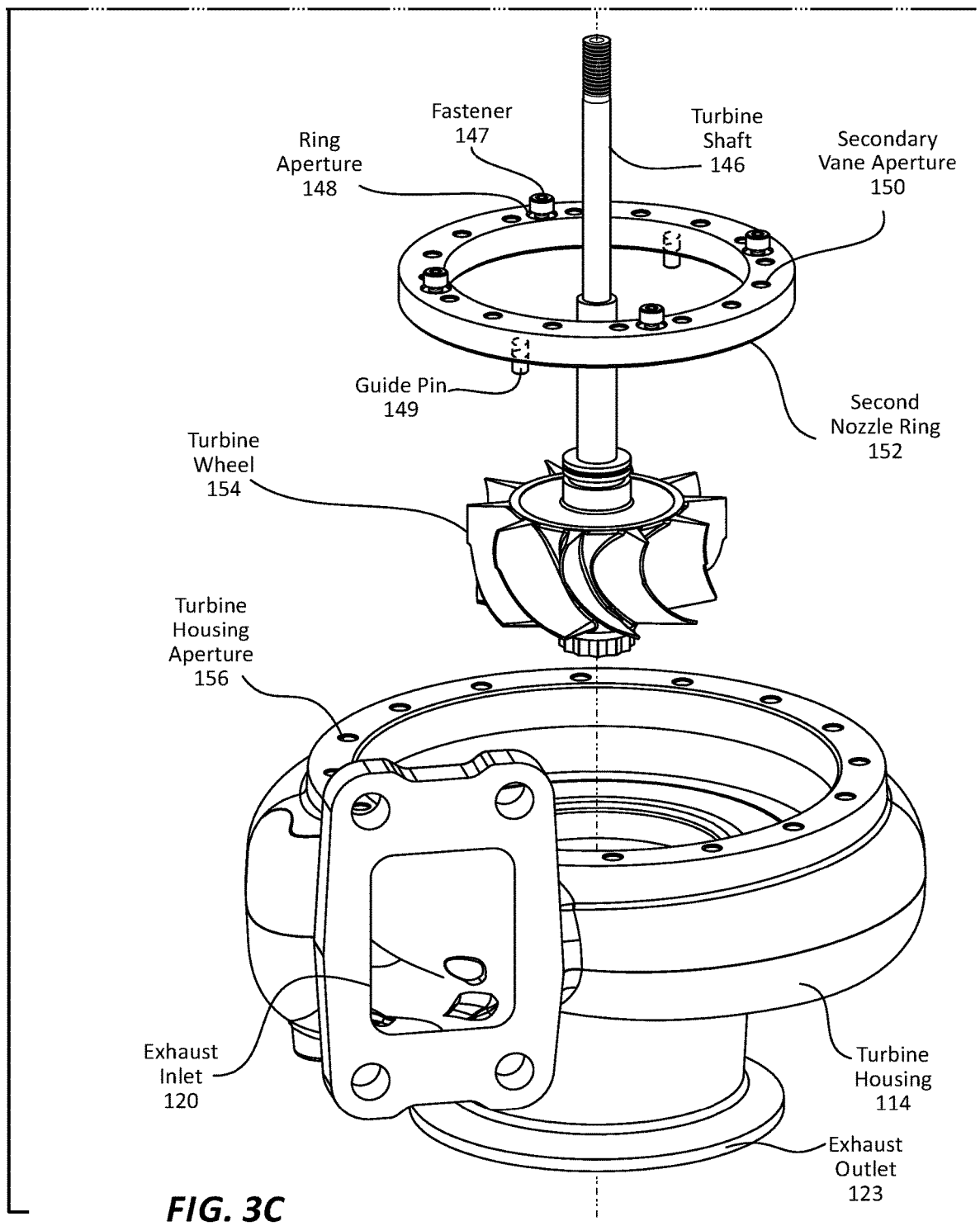

FIGS. 3A-3C jointly comprise a perspective, exploded view of the embodiment of the turbocharger 100 shown in FIG. 1. These figures will be discussed concurrently. It should be noted that, for simplicity, not all features of the turbocharger 100 are illustrated in the figures. For example, ball bearings, journal bearings or bushings, and associated structure in which the turbine shaft 146 rotates are not illustrated.

As illustrated in these figures, the turbocharger 100 comprises a compressor housing 110 having an air outlet 111. A compressor wheel 124 may be positioned and secured on the turbine shaft 146 with the shaft nut 122. The cartridge housing 112 may be secured to the compressor housing 110 utilizing a set of one or more brackets 109 (e.g., C-shaped brackets) and fasteners 115 (e.g., a threaded bolt).

A pair of inwardly projecting brackets 130 may be used to secure the cover plate 113 to the cartridge housing 112. In addition, one or more fasteners 117 may be positioned within turbine housing apertures 156 to secure the cover plate 113 and first nozzle ring 118 to the turbine housing 114. The fasteners 117 may comprise, for example, threaded bolts. In addition, a set of one or more guide pins 119 may be positioned in one or more of the turbine housing apertures 156. Accordingly, the turbine housing apertures 156 may be threaded to receive, for example, the fasteners 117 or may be smooth to receive the guide pins 119. The guide pins 119 may be separate from or integrally formed with the cover plate 113. The guide pins 119 may be used to properly orient the cover plate 113 with respect to the turbine housing 114 while the fasteners 117 are being secured in place. In various embodiments, the actuator 116, linkage 126, and unison crank 128 may be mechanically coupled such that rotational movement within the actuator 116 may be translated into linear movement of the linkage 126, which may be translated into rotational movement of the unison crank 128 with the unison crank 128 being disposed for rotational movement (i.e., rotatably disposed) in the partial circular recess 138 of the first nozzle ring 118. Furthermore, the unison crank 128 may be mechanically coupled to the annular unison ring 136 such that rotational movement of the annular unison ring 136 is translated into rotational movement of the annular unison ring 136 when the annular unison ring 136 is rotatably disposed in the first nozzle ring 118.

Each vane arm 132 may be slidably attached to one of the unison pins 134 and fixedly attached to a vane assembly 144. As used herein the term, "slidably attached" signifies that two components are engaged such that the two components are mechanically coupled but may still slide, pivot or rotate with respect to one another. As used herein, the term "fixedly attached" signifies that two components are mechanically coupled such that the rotation and/or pivoting of one component will result in the rotation and/or pivoting of the other component.

Each vane assembly 144 may be rotatably disposed in a vane aperture 140 of the first nozzle ring 118 and a secondary vane aperture 150 of the second nozzle ring 152. Accordingly, rotational movement of the annular unison ring 136 within the first nozzle ring 118 causes each vane arm 132 to pivot with respect to the vane assembly 144, thereby causing each vane assembly 144 to rotate within a respective vane aperture 140 and a respective secondary vane aperture 150. The rotation of the vane assemblies 144 regulates the amount of the exhaust, and speed and angle of the exhaust that will flow between the first nozzle ring 118 and the second nozzle ring 152 and impinge upon the turbine wheel 154, thereby regulating the rotation of the turbine wheel 154. The vane assemblies 144 may also be positioned in a closed or nearly closed rotational position (as illustrated in FIG. 7B) such that exhaust flow is restricted thereby causing high pressure at the exhaust inlet 120 which then causes a feature in an attached engine called exhaust braking or compression braking.

The rotation of the turbine wheel 154 causes the turbine shaft 146 to also rotate, which, when the turbine shaft 146 is secured to the compressor wheel 124 using the shaft nut 122, also causes the compressor wheel 124 to rotate. The rotation of the compressor wheel 124 will cause air to be pushed through the compressor housing 110 and through the air outlet 111.

As illustrated, one or more fasteners 147 may be positioned within ring apertures 148 to secure the second nozzle ring 152 to the turbine housing 114. Guide pins 149 may be utilized to properly orient the second nozzle ring 152 with respect to the turbine housing 114, for example, while the fasteners 147 are being secured to the turbine housing 114. As indicated previously, the turbine housing 114 may comprise an exhaust inlet 120 through which incoming exhaust from an engine may pass and an exhaust outlet 123 through which exhaust may exit the turbine housing 114.

Figure 4B:
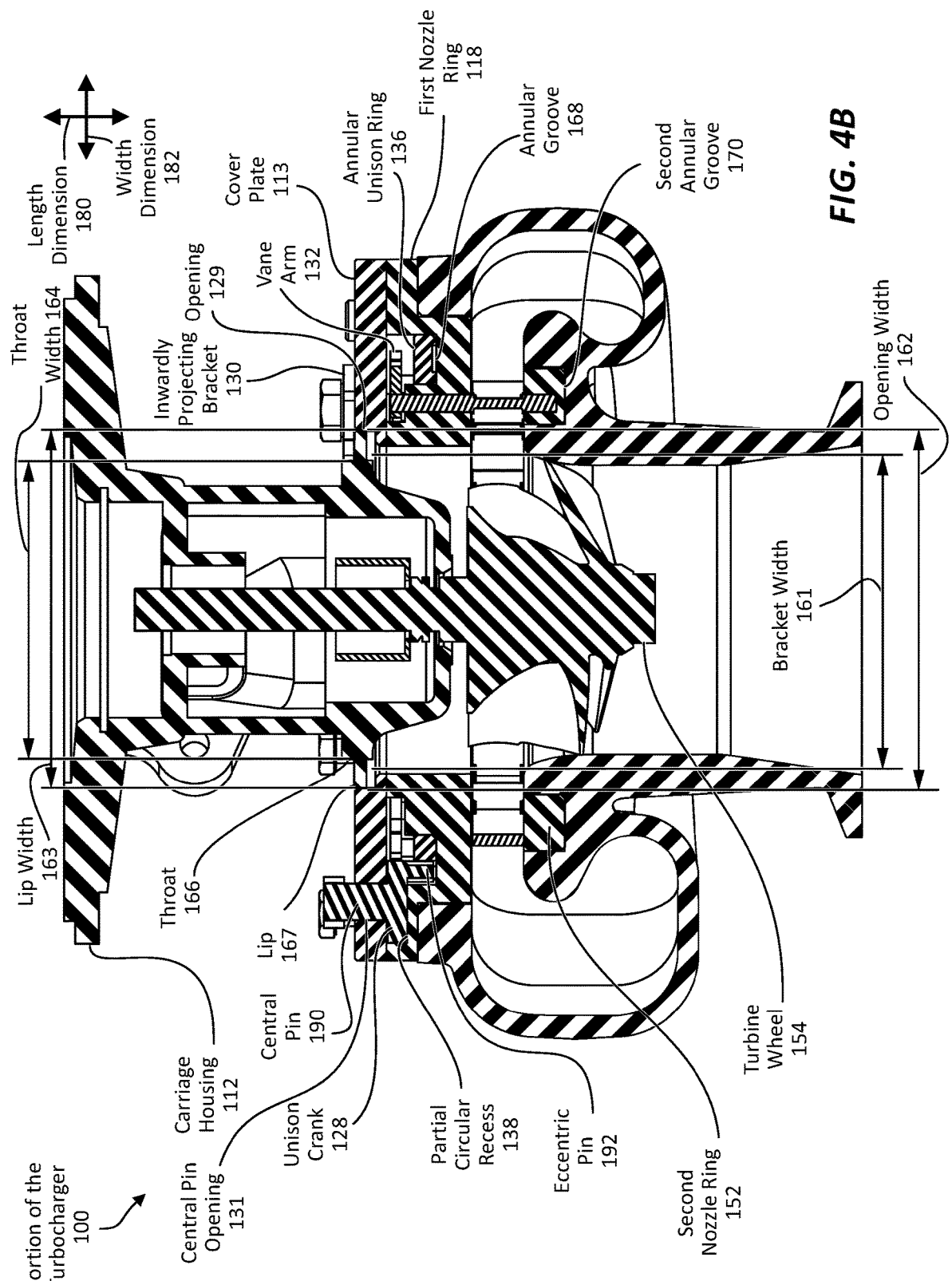
FIG. 4B is a side, cross-sectional view of the portion of the turbocharger shown in FIG. 4A taken across the line 4B-4B.
Figure 5A:
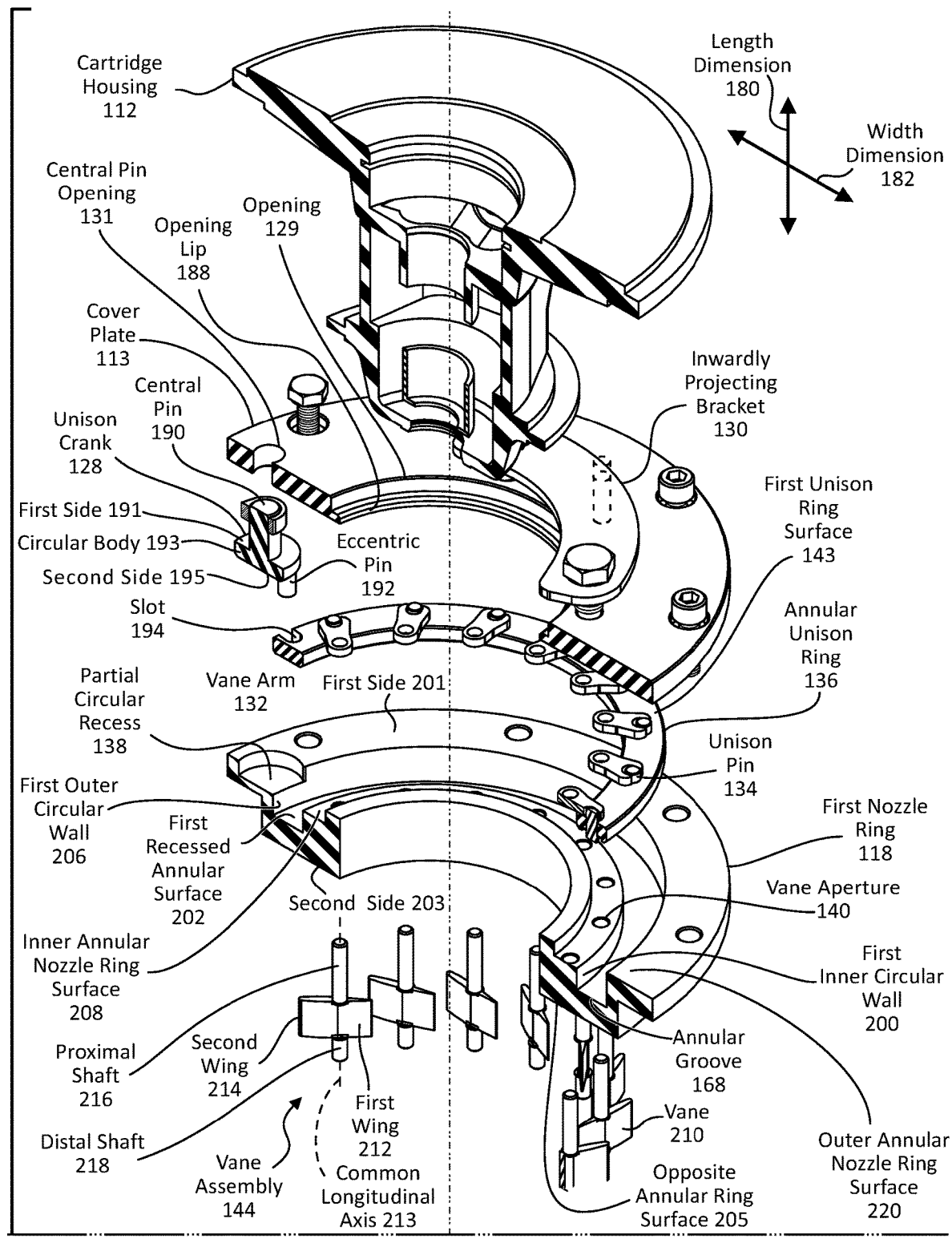
FIGS. 5A-5B jointly comprise an exploded view of the portion of the turbocharger shown in FIG. 4B.
Figure 5B:
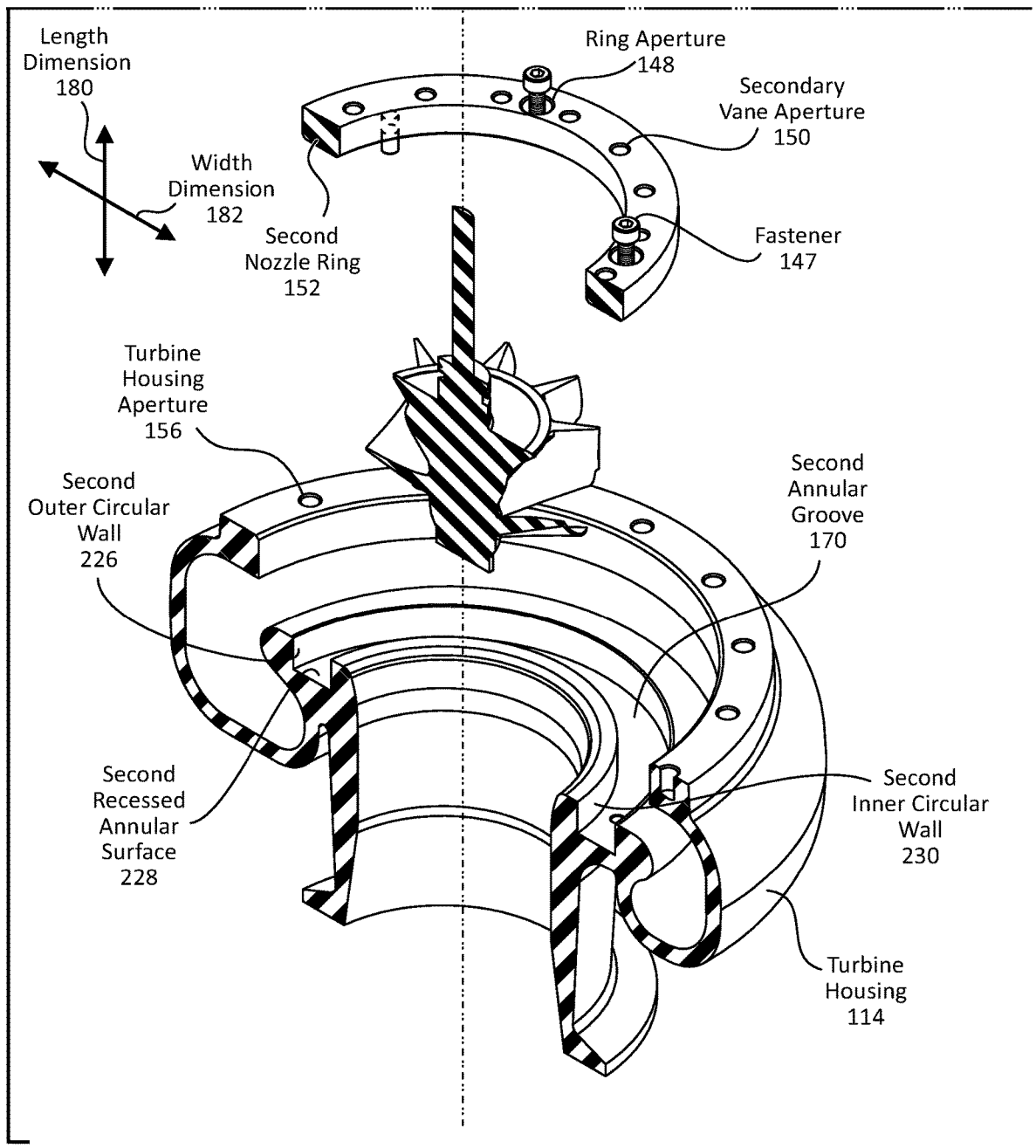
Figure 6A:
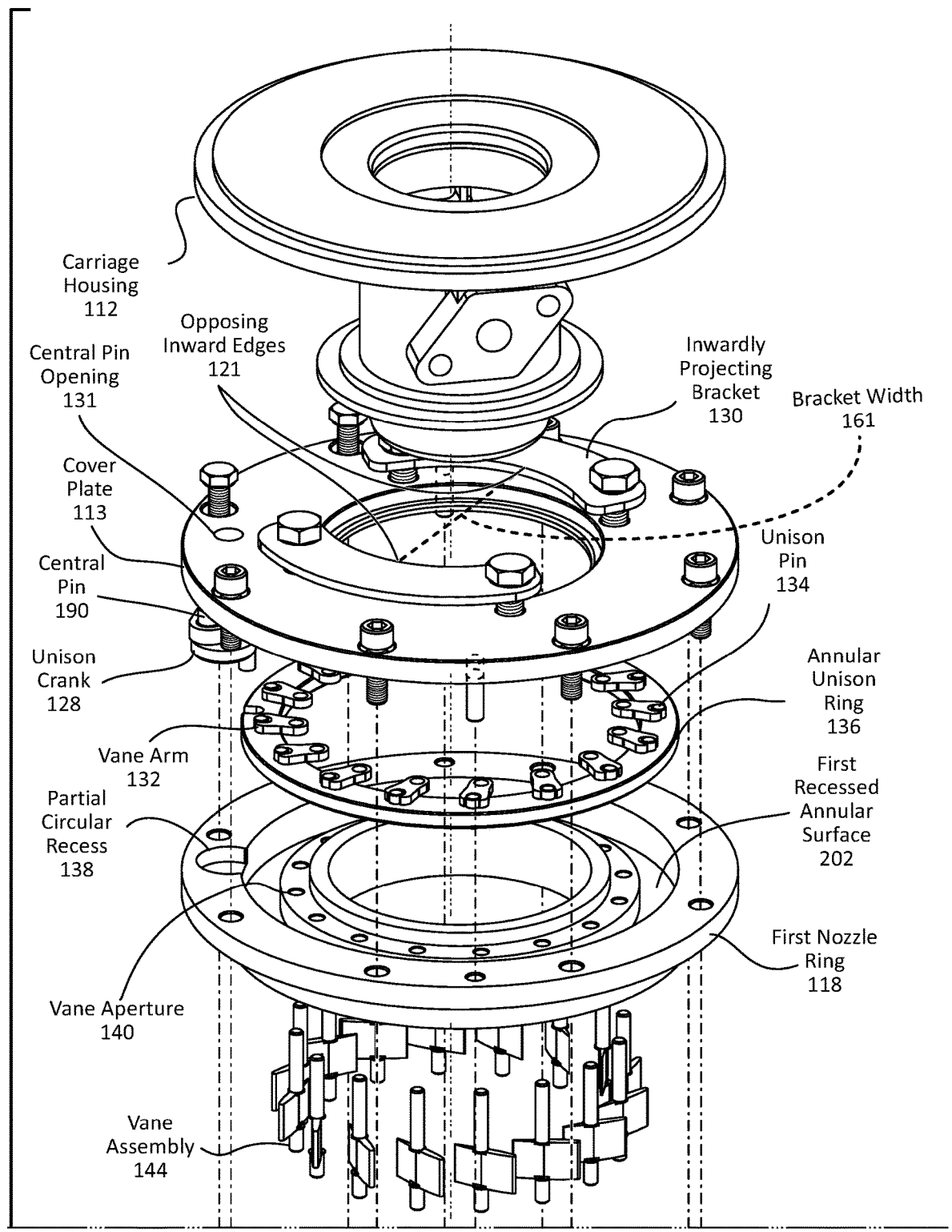
FIG. 6A-6B comprise an exploded view of the portion of the turbocharger shown in FIG. 4A.
Figure 6B:
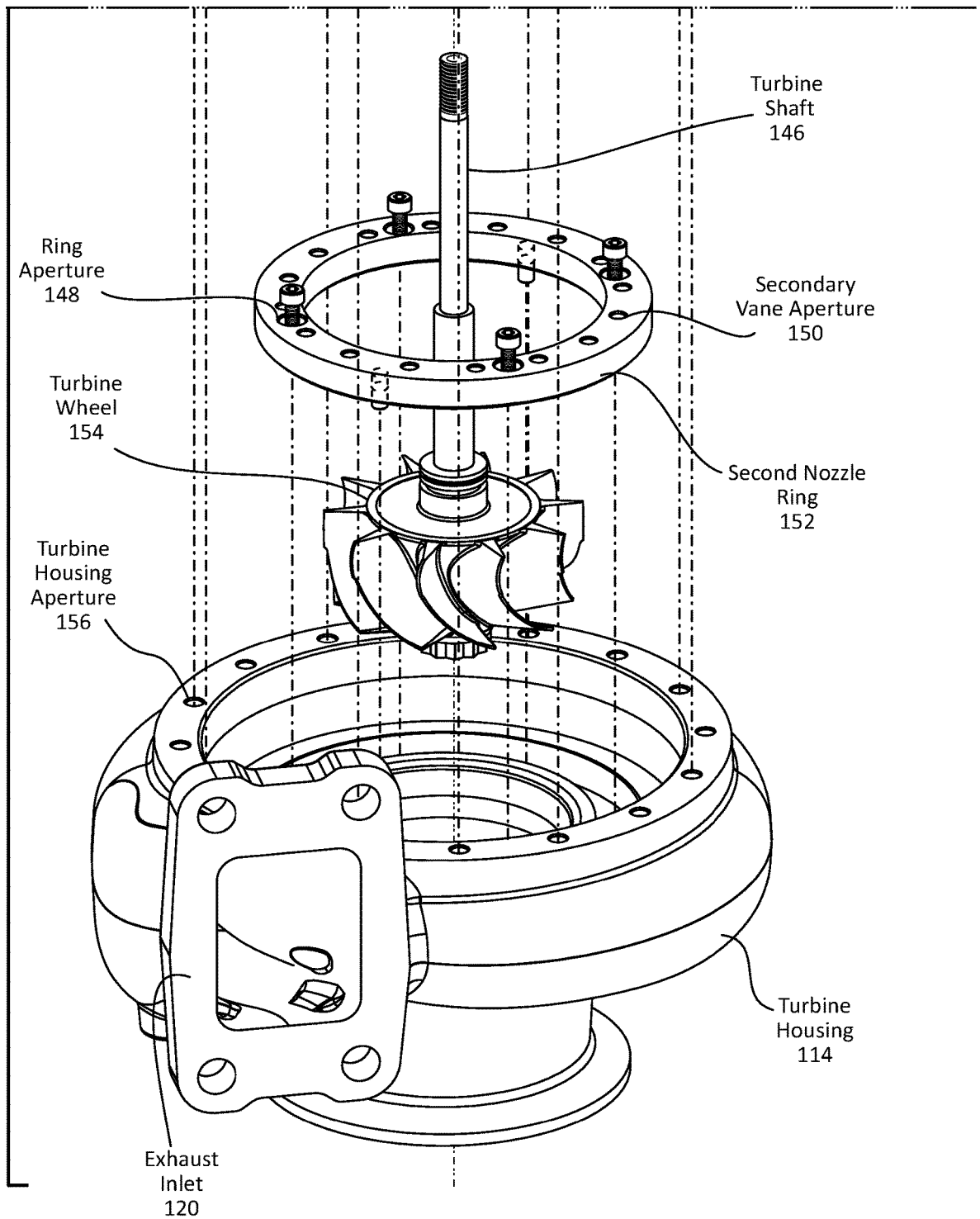

FIGS. 4A-6B will be discussed concurrently. FIG. 4A is a side elevational view of a portion of the embodiment of the turbocharger shown in FIG. 1. FIG. 4B is a side, cross-sectional view of the portion of the turbocharger 100 shown in FIG. 4A taken across the line 4B-4B. FIGS. 5A-5B jointly comprise an exploded view of the portion of the turbocharger 100 shown in FIG. 4B. FIG. 6A-6B comprise an exploded view of the portion of the turbocharger 100 shown in FIG. 4A.

It should be noted that all of the components referenced in the discussion of FIGS. 4A-6B will not be labeled with a reference numeral in each figure. However, a reference numeral will identify each discussed component in at least one of FIGS. 4A-6B.

It should be noted that the turbocharger 100 comprises a length dimension 180 (a dimension extending from the compressor housing 110 to the turbine housing 114) and a width dimension 182 (a dimension perpendicular to the length dimension 180), which is illustrated in dimensional keys in FIGS. 4B, 5A and 5B.

It should also be noted that FIGS. 4A-6B illustrate only a portion of the turbocharger 100. Thus, in these figures, for example, the compressor housing 110, air outlet 111, shaft nut 122, linkage 126, actuator 116 and compressor wheel 124 have been omitted to better illustrate the remaining components.

It should also be noted that the cross-sectional cut illustrated in FIG. 4A along the line 4B-4B is offset from a centerline across the width dimension 182 of the portion of the turbocharger 100 and that the turbine shaft 146 is of a terraced width such that only a portion of the turbine shaft 146 is visible in FIGS. 4B and 5B. However, the turbine shaft 146 is visible in FIG. 6B.

Now with reference to FIG. 4A-6B, the illustrated cartridge housing 112 may comprise a throat 166 and a lip 167. The lip 167 may have a lip width 163 (along the width dimension 182) and the throat 166 may have a throat width 164 (also along the width dimension 182). The lip width 163 is greater than the throat width 164. The cover plate 113 includes an opening 129 having an opening width 162. The lip width 163 may be less than or equal to the opening width 162. The inwardly projecting brackets 130 comprise inwardly opposing edges 121 that define a bracket width 161 when the inwardly projecting brackets 130 are secured to the cover plate 113. The bracket width 161 is less than the lip width 163 but greater than or equal to the throat width 164 such that the lip 167 is retained within the opening 129 when the inwardly projecting brackets 130 are secured to the cover plate 113. In various embodiments, the cover plate 113 may comprise an opening lip 188 to limit movement of the lip 167 of the cartridge housing 112 along the length dimension 180 when the lip 167 is secured by the inwardly projecting brackets 130.

As indicated previously, the unison crank 128 may be coupled to linkage 126, which is in turn coupled to the actuator 116. The unison crank 128 may comprise a circular body 193 having a first side 191 and a second side 195. A central pin 190 extends from the first side 191 and an eccentric pin 192 extends from the second side 195. The central pin 190 is centrally disposed on the first side 191, while the eccentric pin 192 is offset relative to a center point of the circular body 193 on the second side 203. The central pin 190 may be rotatably positioned within a central pin opening 131 of the cover plate 113.

The actuator 116 and linkage 126 may cause the circular body 193 to rotate within the partial circular recess 138. The eccentric pin 192 may be disposed in the slot 194 of the annular unison ring 136. In various embodiments, and as illustrated, the slot 194 may be in the outer periphery of the annular unison ring 136. Thus, when the annular unison ring 136 is rotatably disposed in the annular groove 168 and the eccentric pin 192 is positioned within the slot 194, rotation of the unison crank 128 will cause the annular unison ring 136 to rotate within the annular groove 168.

In one embodiment, the slot 194 has an open end, as illustrated in the figures. In an alternative embodiment, the slot 194 may have an enclosed end and thus may simply be an enclosed opening positioned in the annular unison ring 136.

The annular unison ring 136 comprises a series of unison pins 134 extending away from a first unison ring surface 143. A vane arm 132 is slidably attached to each unison pin 134 and is fixedly attached to a vane assembly 144. The unison pins 134 may be integrally formed with the annular unison ring 136 or may be separately formed and engage the annular unison ring 136.

As illustrated, a first side 201 of the first nozzle ring 118 may comprise an outer annular nozzle ring surface 220, an annular groove 168, and an inner annular nozzle ring surface 208. A second side 203 of the first nozzle ring 118 is disposed opposite the first side 201. The second side 203 may comprise an opposite annular ring surface 205. Each vane aperture 140 may extend through the first nozzle ring 118 from the inner annular nozzle ring surface 208 to the opposite annular ring surface 205. The partial circular recess 138 is disposed in the outer annular nozzle ring surface 220.

The annular groove 168 comprises a first inner circular wall 200, a first recessed annular surface 202, and a first outer circular wall 206. The first recessed annular surface 202 is offset from the outer annular nozzle ring surface 220 along the length dimension 180 and is disposed between the first inner circular wall 200. In various embodiments, the first recessed annular surface 202 may be substantially parallel to the outer annular nozzle ring surface 220.

Each vane assembly 144 may comprise a proximal shaft 216, a distal shaft 218, and a vane 210. The proximal shaft 216 and the distal shaft 218 may extend along or be coaxial with a common longitudinal axis 213. The vane 210 may be disposed intermediate the proximal shaft 216 and the distal shaft 218. As illustrated, each vane 210 may comprise a first wing 212 and a second wing 214, each of which may extend away from the common longitudinal axis 213. As illustrated, the first wing 212 and the second wing 214 are symmetrical about the common longitudinal axis 213. In various alternative embodiments, the wings 212, 214 may be of a symmetrical shape that is different than the shape illustrated in the figures, or one wing 212, 214 may be longer than the other or may have a different shape than the other. Also, each of the wings 212, 214 may be embodied in different ways and may not necessarily extend directly opposite one another relative to the common longitudinal axis 213.

The second nozzle ring 152 comprises a plurality of secondary vane apertures 150 for receiving a remote end of the distal shaft 218. The second nozzle ring 152 also includes a plurality of ring apertures 148 for receiving a fastener 147 with the fasteners 147 being utilized to secure the second nozzle ring 152 to the turbine housing 114 and, in particular, within the second annular groove 170.

As indicated above, the turbine housing 114 comprises a plurality of turbine housing apertures 156 for receiving fasteners 117 or guide pins 119. The second annular groove 170 comprises a second outer circular wall 226, a second recessed annular surface 228, and a second inner circular wall 230. In one embodiment, the second nozzle ring 152 is integrally formed with the turbine housing 114. One reason for separately forming the second nozzle ring 152 from the turbine housing 114 is that different materials may be used for the second nozzle ring 152. Additionally or alternatively, a metal from which the second nozzle ring 152 is made may be hardened to increase the durability and lifespan of the turbocharger 100.

When assembled, the proximal shaft 216 of each vane assembly 144 is rotatably disposed in one of the vane apertures 140 with the vane 210 disposed adjacent to the second side 203 and a remote end of the proximal shaft extends through the inner annular nozzle ring surface 208. A remote end of the distal shaft 218 of each vane assembly 144 is rotatably disposed in a secondary vane aperture 150 of the second nozzle ring 152. Accordingly, each vane assembly 144 may pivot about the common longitudinal axis 213.

Accordingly, when the annular unison ring 136 rotates within the annular groove 168 (in response to movement of the electronic actuator 116, linkage 126, and the unison crank 128), each of the unison pins 134 is moved, thereby causing each vane arm 132 to pivot with respect to the common longitudinal axis 213, thereby causing openings intermediate the vanes 210 to increase or decrease in size and thus regulating the flow, speed, and angle of exhaust (received via the exhaust inlet 120) to the turbine wheel 154. The regulation of the flow of exhaust into the turbine wheel 154 regulates the rotation of the compressor wheel 124, which affects how much air is injected into an engine that is in fluid communication with the air outlet 111.

Figure 7A:
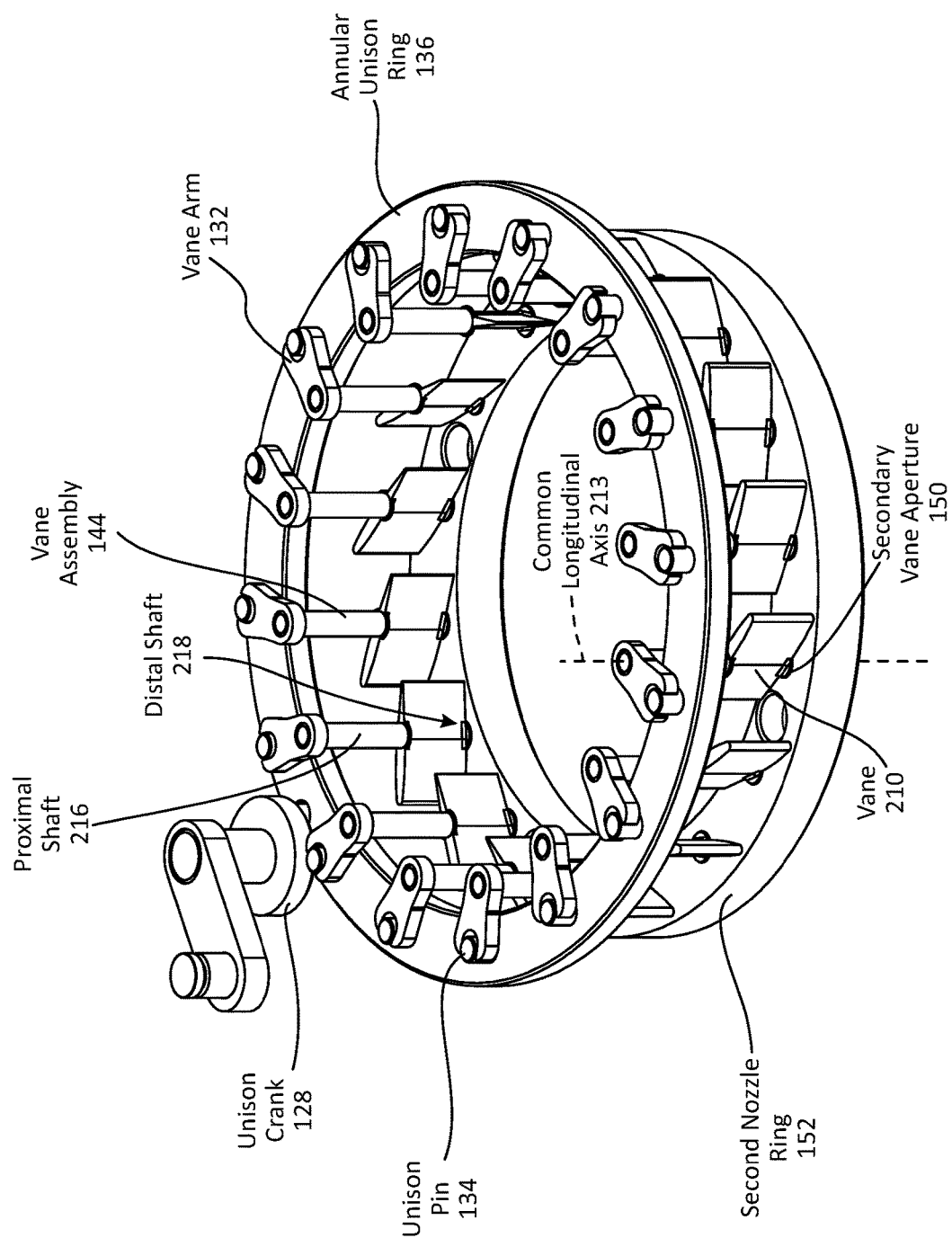
FIG. 7A is a perspective view of one embodiment of a combination of an annular unison ring, a second nozzle ring, and a unison crank with a plurality of unison pins, vane arms, and vane assemblies in an assembled state with the vane assemblies in one possible partially open position.
Figure 7B:
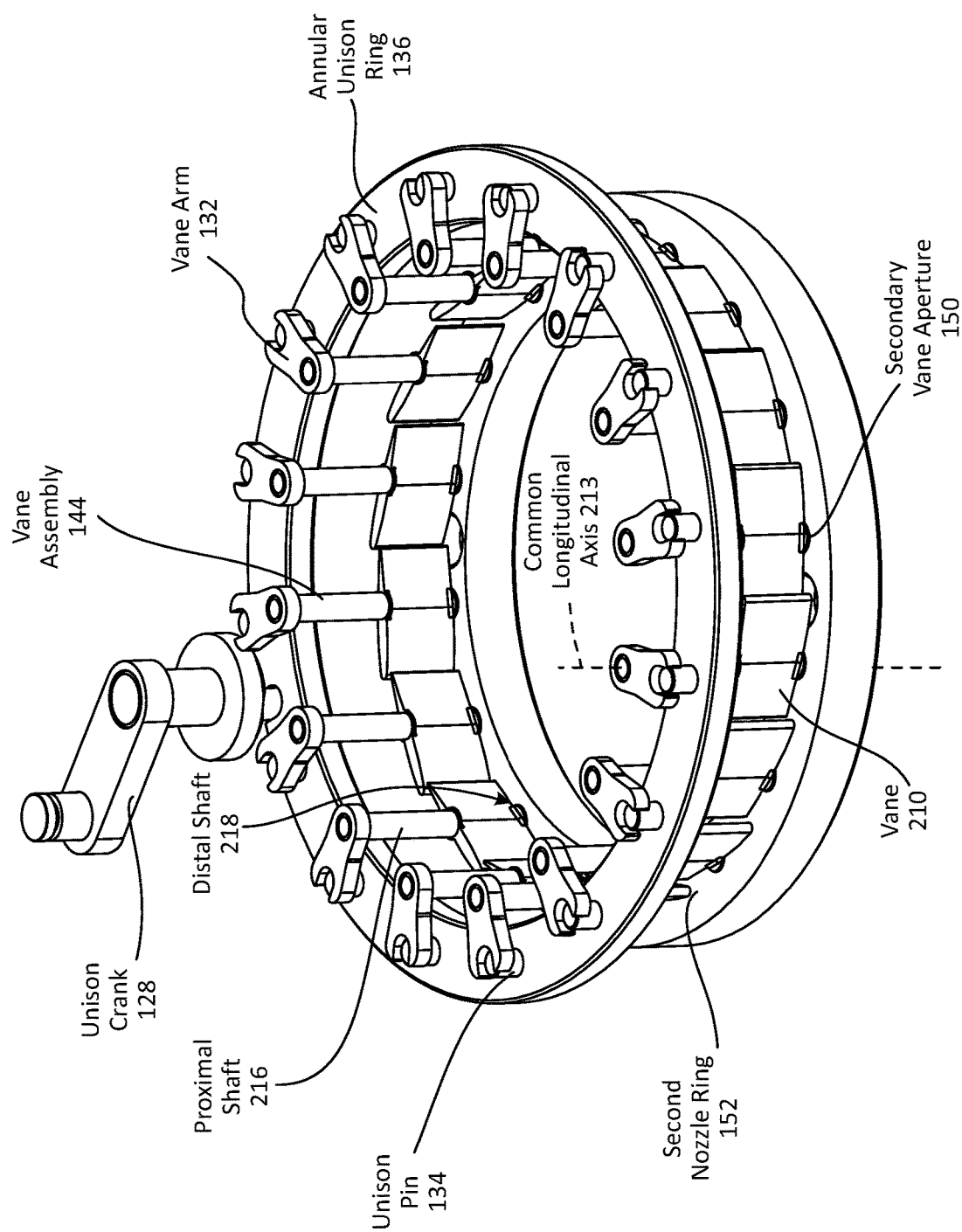
FIG. 7B is a perspective view of one embodiment of a combination of an annular unison ring, a second nozzle ring, and a unison crank with a plurality of unison pins, vane arms, and vane assemblies in an assembled state with the vane assemblies in a closed position.

FIG. 7A is a perspective view of one embodiment of a combination of an annular unison ring 136, a second nozzle ring 152, and a unison crank 128 with a plurality of unison pins 134, vane arms 132, and vane assemblies 144 in an assembled state with the vane assemblies 144 in one possible open position. FIG. 7B illustrates the same components but with the vane assemblies 144 in a closed position. FIG. 7A-7B will be discussed concurrently. As illustrated in these figures, in response to rotation of the unison crank 128, which is controlled by the actuator 116, the annular unison ring 136 rotates. This rotation, in turn, causes each of the vane arms 132 to pivot with respect to the common longitudinal axis 213 of each vane assembly 144 (i.e., to pivot with the distal shaft 218 at least partially disposed in a secondary vane aperture 150). It should also be noted, although not illustrated in FIGS. 7A-7B, the proximal shaft 216 of each vane assembly 144 may rotate within a vane aperture 140 of the first nozzle ring 118. Because the vane arms 132 are fixedly attached to the vane assembly 144, the rotation of the vane arms 132 causes the vane assembly 144 and the vanes 210 to pivot with respect to each common longitudinal axis 213, which alters openings between the vanes 210. Consequently, openings between the vanes 210 may be altered to regulate the amount of exhaust flowing into and striking the turbine wheel 154.

FIG. 8 is a perspective view of one embodiment of a combination of an annular unison ring 136, a second nozzle ring 152, and a unison crank 128 with a plurality of unison pins 134, vane arms 132, and vane assemblies 144 (including a first vane assembly 144-1) with the second nozzle ring 152 spaced apart from the vane assemblies 144. A combination of the annular unison ring 136, a unison crank 128, the vane arms 132, and vane assemblies 144 (which may collectively be referred to as a repositionable assembly 233) may be positioned at different rotational orientations with respect to the second nozzle ring 152. For example, the repositionable assembly 233 may be positioned at different rotational orientations with respect to the second nozzle ring 152 such that the first vane assembly 144-1 is positioned in the first vane aperture 140-1, positioned in a secondary vane aperture 140-2 or positioned in any of the remaining vane apertures 140. FIGS. 9A-9P illustrate the repositionable assembly 233, including a unison crank 128, at sixteen different rotational orientations with respect to the second nozzle ring 152. Of course, in various embodiments, the number of potential rotational orientations may vary depending on the number of vane assemblies 144 and vane apertures 140.

The different rotational orientations allow positioning of the unison crank 128, actuator 116 and/or linkage 126 at different locations to accommodate space available within a particular vehicle. In various embodiments, linkage 126 of different lengths or configurations may be used to accommodate and avoid impinging on, for example, the exhaust inlet 120.

Figure 10:
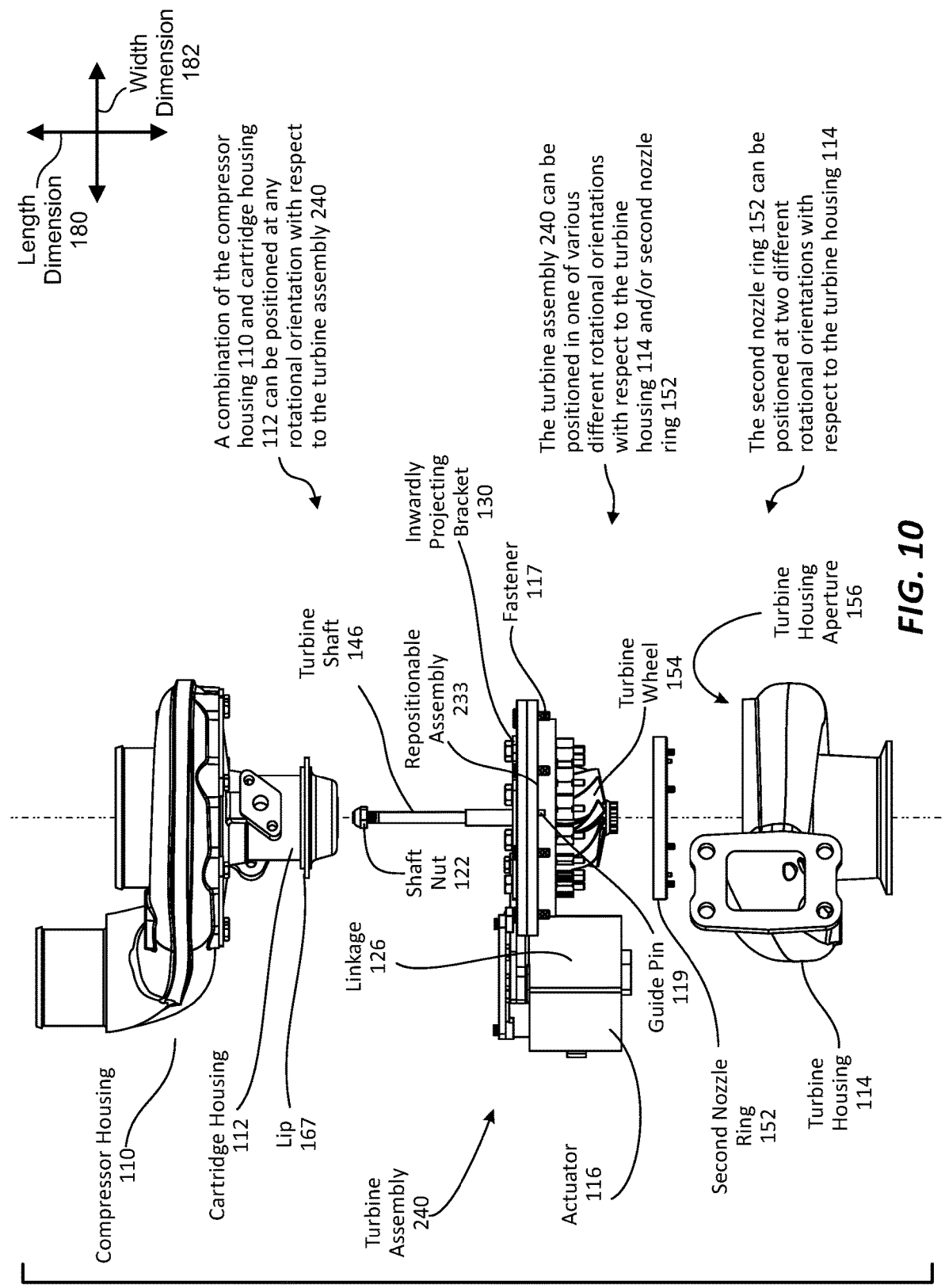
FIG. 10 is a partially exploded view of the embodiment of the turbocharger shown in FIG. 1.

FIG. 10 is a partially exploded view of the embodiment of the turbocharger 100 shown in FIG. 1. As illustrated, a combination of the compressor housing 110 and cartridge housing 112 can be positioned at any rotational orientation with respect to the turbine assembly 240, which may include the actuator 116, the linkage 126, the repositionable assembly 233, the turbine shaft 146, the shaft nut 122, and the turbine wheel 154. In various alternative embodiments, the turbine assembly 240 may include the actuator 116, the linkage 126, and the repositionable assembly 233 (e.g., excluding the turbine shaft 146, the shaft nut 122, and the turbine wheel 154). The combination of the lip 167 and inwardly projecting brackets 130 enable an infinite number of rotational orientations between the turbine assembly 240 and a combination of the compressor housing 110 and the cartridge housing 112.

The illustrated turbine assembly 240 may be positioned at a number of different rotational orientations with respect to the second nozzle ring 152. For example, as illustrated in FIGS. 9A-9P, the turbine assembly 240 (which includes the repositionable assembly 233) may be positioned, for example, at sixteen different rotational orientations with respect to the second nozzle ring 152.

In various embodiments, other structural features (beyond the repositionable assembly 233 and the second nozzle ring 152) restrict the number of rotational orientations that may be available for a particular design. For example, in various embodiments, consecutive turbine housing apertures 156 may be smooth and threaded around a perimeter of the turbine housing 114. Thus, because, in various embodiments, a fastener 117 cannot be positioned in a smooth turbine housing aperture 156 (or, alternatively, a guide pin 119 cannot be positioned within a threaded turbine housing aperture 156), the number of potential orientations is limited, such that, for example, only eight potential rotational orientations might be available rather than sixteen. Of course, in various embodiments, these limitations may not be present if, for example, all of the turbine housing apertures 156 are threaded and no guide pins 119 are used.

Thus, the repositionable assembly 233 (each component thereof, including the cover plate 113 and first nozzle ring 118) is repositionable and fixable at different rotational orientations with respect to the second nozzle ring 152 and/or the turbine housing 114 employing, for example, the fasteners 117 and/or guide pins 119 for engagement with the turbine housing apertures 156. It should be noted that, in various embodiments, in order to enable repositioning and fixing of the repositionable assembly 233, a number of secondary vane apertures 150 (in which vane assemblies 144 are to be positioned) must be a whole number multiple or whole number divisor of a number of turbine housing apertures 156 (in which fasteners 117 are to be positioned). In addition, in various embodiments, the turbine housing apertures 156 (in which fasteners 117 are to be positioned) must be equally spaced apart and secondary vane apertures 150 (in which vane assemblies 144 are to be positioned) must be equally spaced apart to allow fixing and repositioning. In various embodiments, the second nozzle ring 152 may be positioned at different orientations with respect to the turbine housing 114, as illustrated in and explained in connection with FIGS. 11A-11B.

Figure 11A:
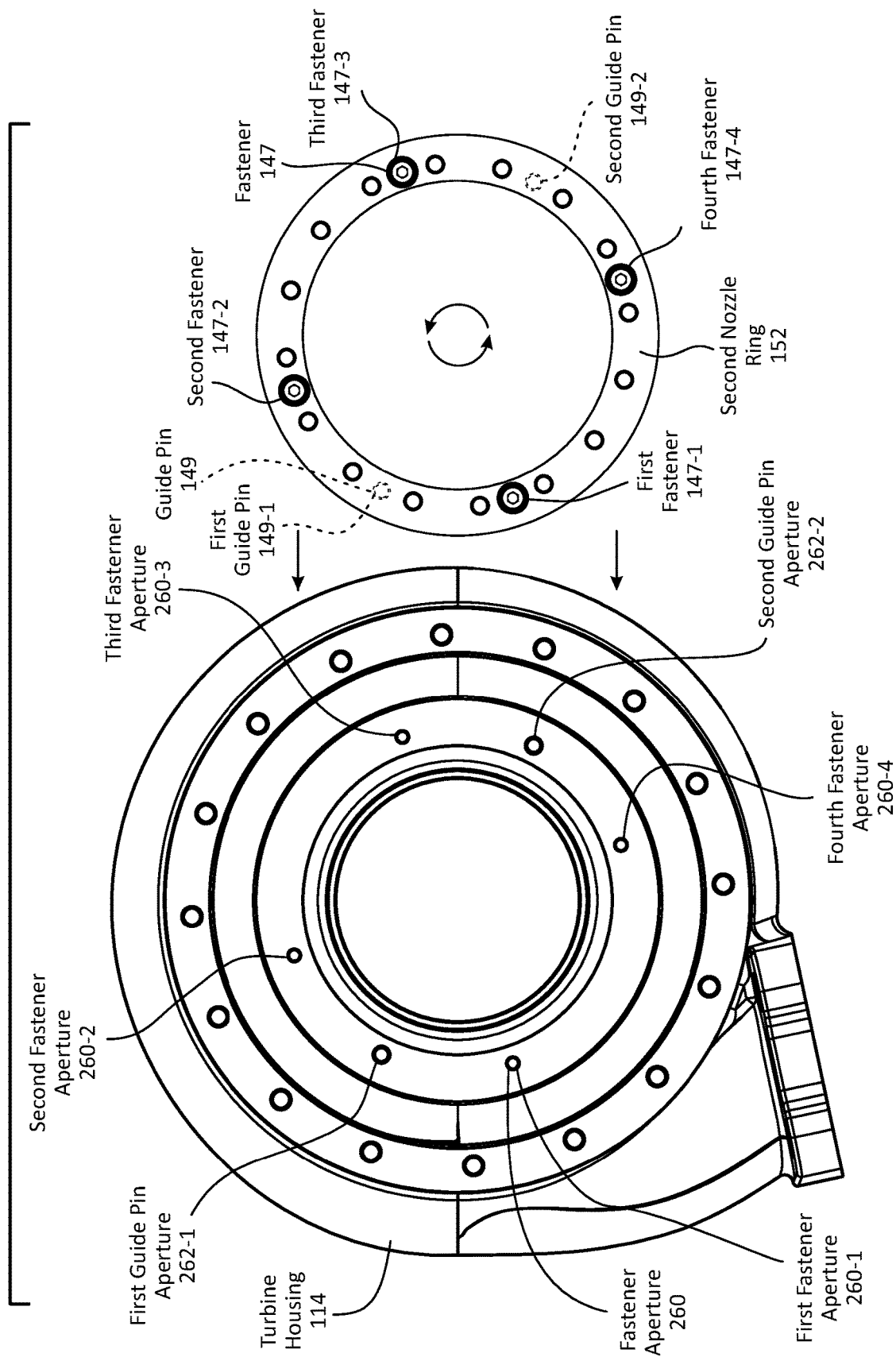
FIG. 11A is a top view of one embodiment of a turbine housing and one embodiment of a second nozzle ring to illustrate one potential orientation of the embodiment of the second nozzle ring with respect to the embodiment of the turbine housing.
Figure 11B:
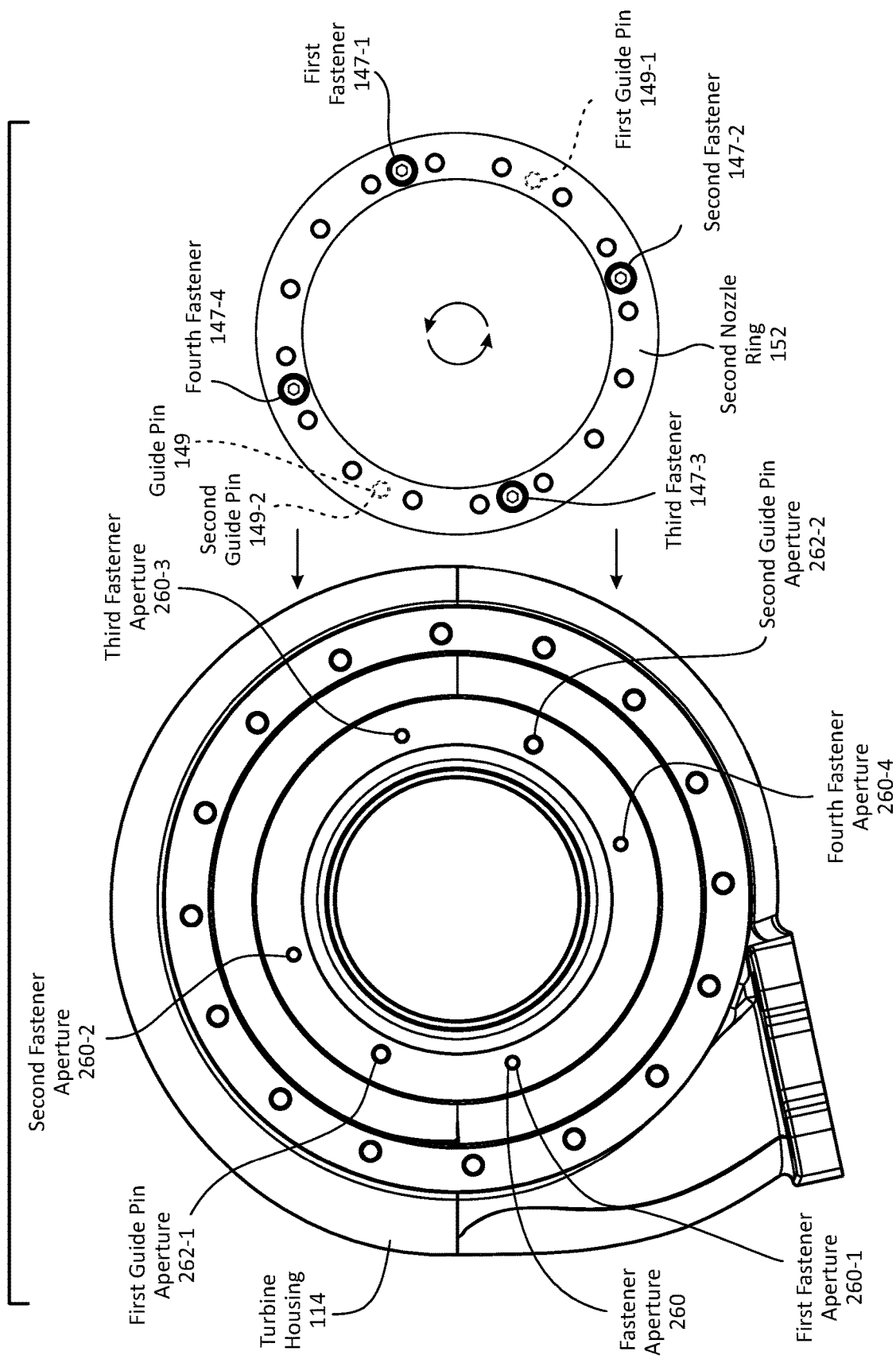
FIG. 11B is a top view of one embodiment of a turbine housing and one embodiment of a second nozzle ring to illustrate another potential orientation of the embodiment of the second nozzle ring with respect to the embodiment of the turbine housing.

FIG. 11A is a top view of one embodiment of a turbine housing 114 and one embodiment of a second nozzle ring 152 to illustrate one potential orientation of the embodiment of the second nozzle ring 152 with respect to the embodiment of the turbine housing 114. FIG. 11B illustrates the same components 114, 152 in a different rotational orientation. In FIGS. 11A-11B, the second nozzle ring 152 is shown offset to the right of the turbine housing 114 for illustrative purposes, but when installed, the second nozzle ring 152 would, of course, be superimposed on the turbine housing 114.

As illustrated in FIG. 11A, a first fastener 147-1 may be positioned within a first fastener aperture 260-1, a second fastener 147-2 may be positioned within a second fastener aperture 260-2, a third fastener 147-3 may be positioned within a third fastener aperture 260-3, a fourth fastener 147-4 may be positioned within a fourth fastener aperture 260-4, a first guide pin 149-1 may be positioned within a first guide pin aperture 262-1, and a second guide pin 149-2 may be positioned within a second guide pin aperture 262-2 in a first rotational orientation.

As illustrated in FIG. 11B, a first fastener 147-1 may be positioned within a third fastener aperture 260-3, a second fastener 147-2 may be positioned within a fourth fastener aperture 260-4, a third fastener 147-3 may be positioned within a first fastener aperture 260-1, a fourth fastener 147-4 may be positioned within a second fastener aperture 260-2, a first guide pin 149-1 may be positioned within a second guide pin aperture 262-2, and a second guide pin 149-2 may be positioned within a first guide pin aperture 262-1 in a first rotational orientation. It should be noted that other variations are possible, such as by omitting the use of guide pins 149 and/or using a symmetrical set of fastener apertures 260 of varying numbers with corresponding symmetrical openings in the second nozzle ring 152.

Figure 15:
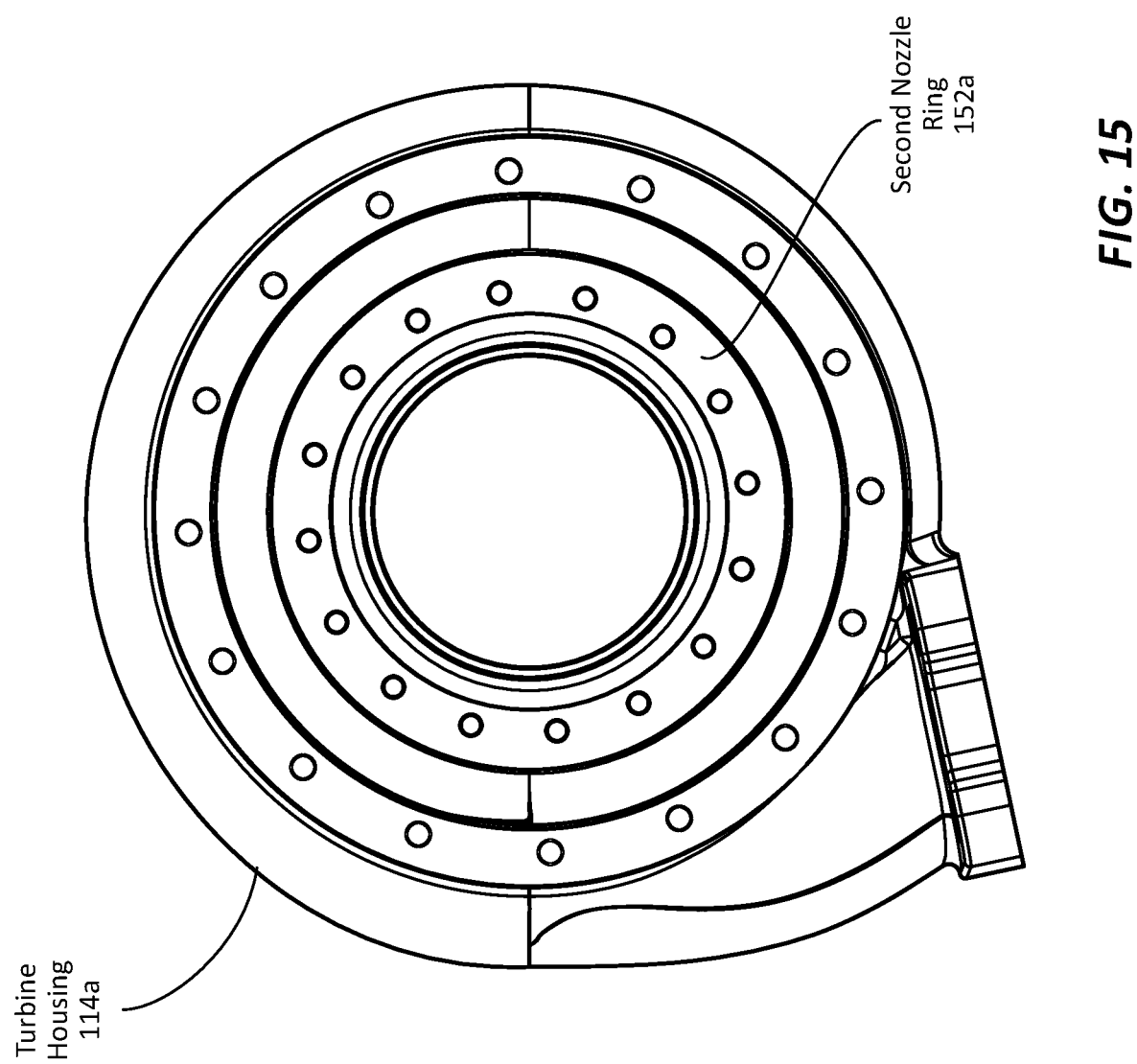
FIG. 15 is a top view of an alternative embodiment of a turbine housing comprising an integrally formed second nozzle ring.

Thus, the second nozzle ring 152 is repositionable and fixable at different rotational orientations with respect to the turbine housing 114 employing, for example, the fasteners 147 and/or guide pins 149. In an alternative embodiment, as illustrated in FIG. 15, the second nozzle ring 152a may be integrally formed with the turbine housing 114a. One reason for separately forming the second nozzle ring 152 is that the second nozzle ring 152 may be hardened or made of a different material to increase the lifespan of the turbocharger 100.

Figure 12:
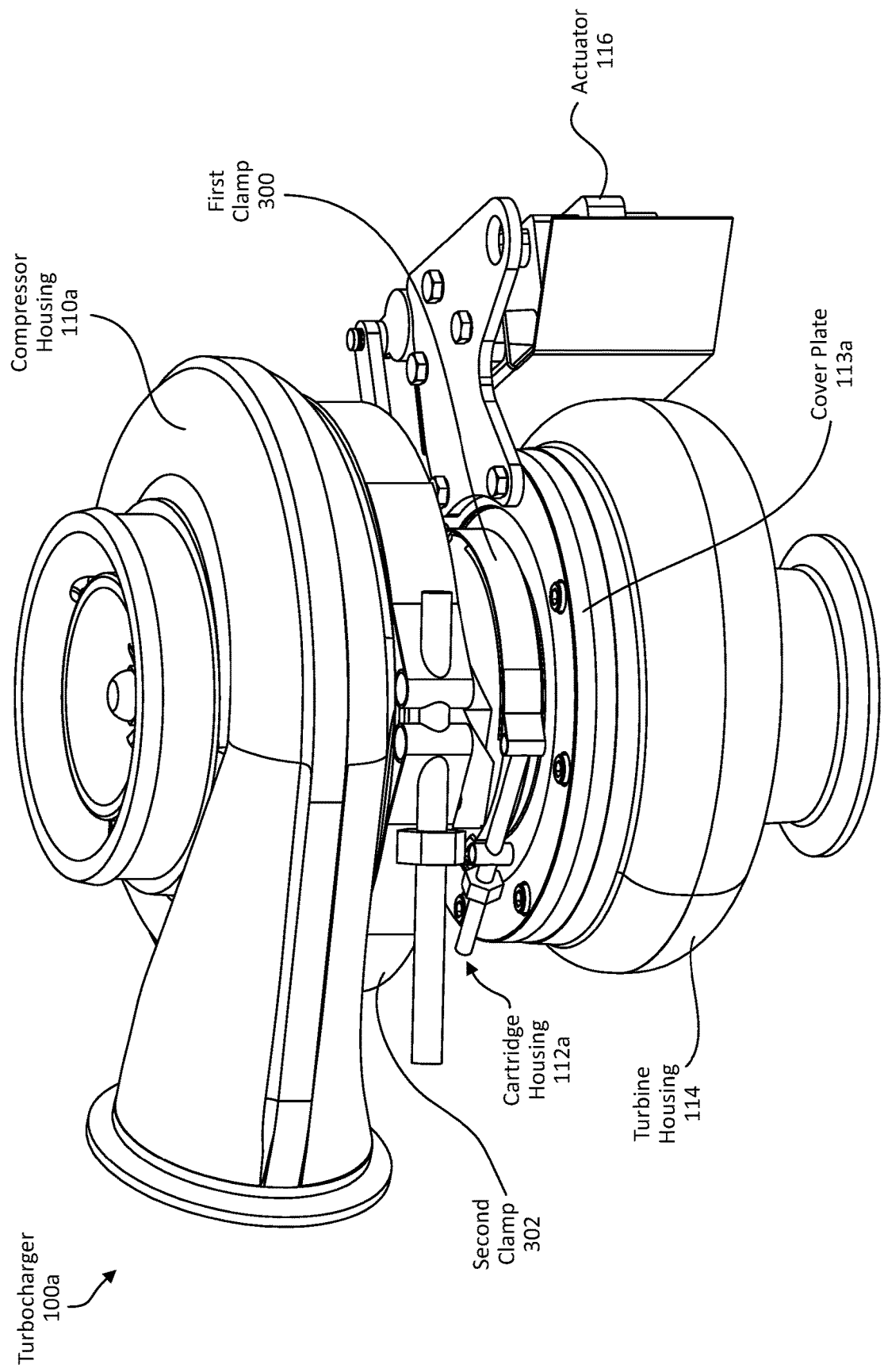
FIG. 12 is a top perspective view of an alternative embodiment of the turbocharger.

FIG. 12 is a top perspective view of an alternative embodiment of the turbocharger 100a. The illustrated turbocharger 100a comprises a compressor housing 110a, a cartridge housing 112a, a turbine housing 114, an actuator 116, a cover plate 113a, a first clamp 300, and a second clamp 302. The turbocharger 100a differs from the turbocharger 100 illustrated in FIG. 1 in various ways. For example, the cover plate 113a and cartridge housing 112a are different in design from the cover plate 113 and the cartridge housing 112 illustrated in connection with FIG. 1. In addition, neither the first or second clamp 300, 302 were included in the turbocharger 100a illustrated in FIG. 1. The second clamp 302 will not be discussed in detail in this application; however, the cartridge housing 112a, cover plate 113a, and first clamp 300 will be discussed and illustrated further in connection with FIGS. 13 and 14.

Figure 13:
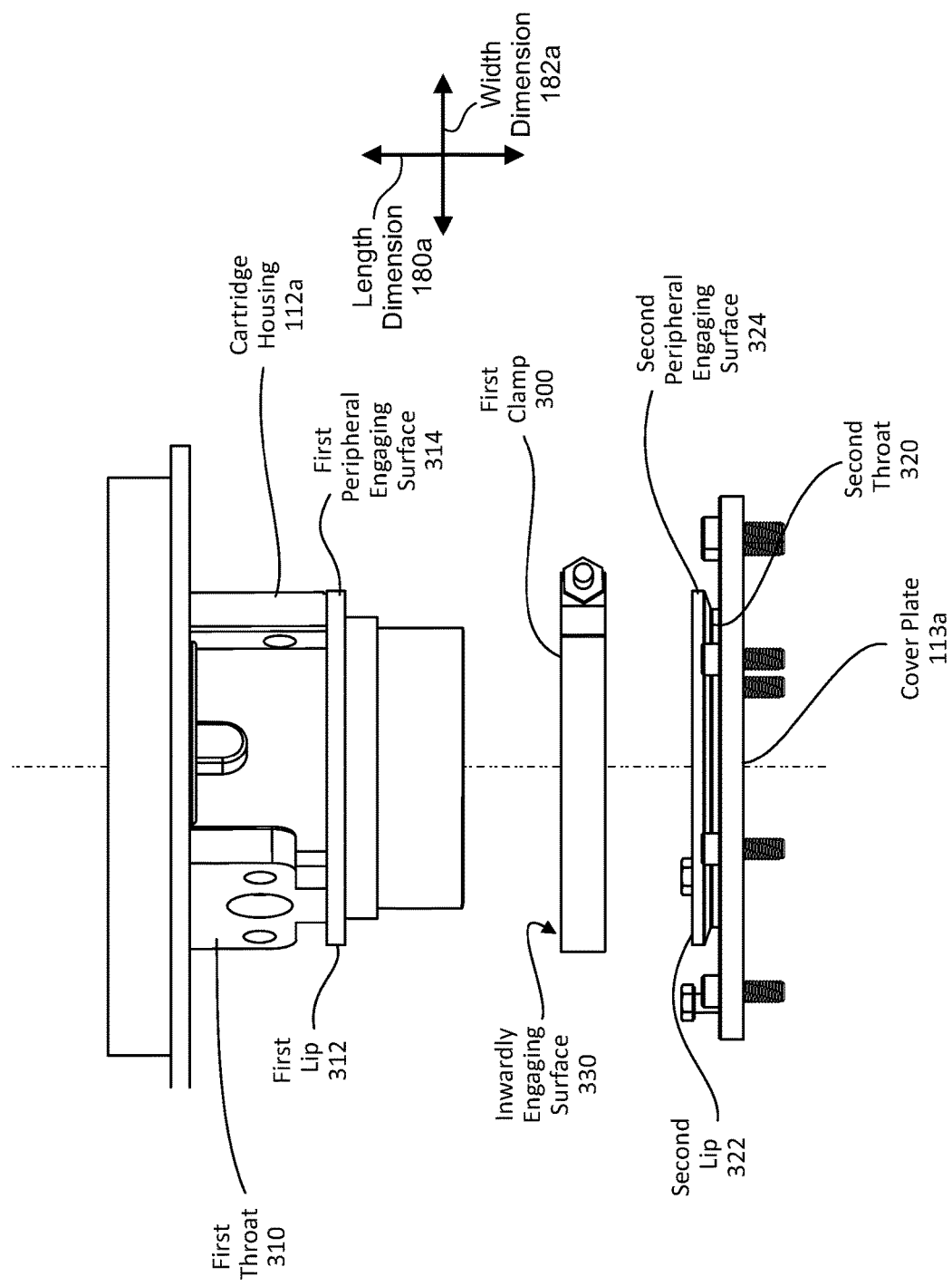
FIG. 13 is a side, exploded view of the cartridge housing, first clamp, and cover plate of the alternative embodiment of the turbocharger.
Figure 14:
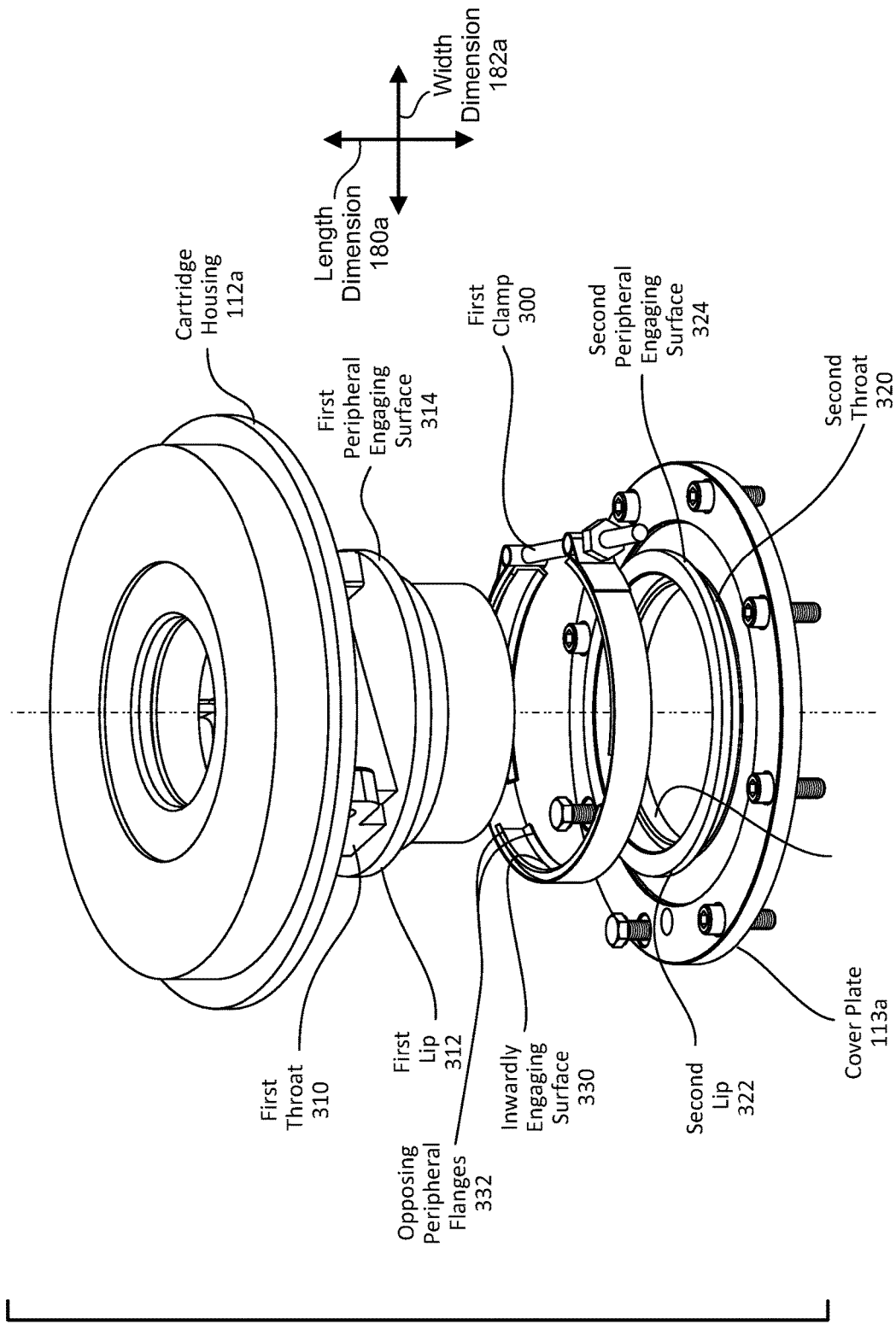
FIG. 14 is a top perspective, exploded view of the cartridge housing, first clamp, and cover plate of the alternative embodiment of the turbocharger.

FIG. 13 is a side, exploded view of embodiments of the cartridge housing 112a, the first clamp 300, and the cover plate 113a of the illustrative embodiment of the turbocharger 100a. FIG. 14 illustrates the same components 112a, 113a, 300 but in a top perspective, exploded view. FIGS. 13 and 14 will be discussed concurrently.

The turbocharger 100a may comprise a length dimension 180a and a width dimension 182a.

The cartridge housing 112a may comprise a first throat 310 and a first lip 312 having a first peripheral engaging surface 314. The first throat 310 may be narrower along the width dimension 182a than the first lip 312.

The cover plate 113a may include a second throat 320 and a second lip 322 having a second peripheral engaging surface 324. The second lip 322 may be wider than the second throat 320 along the width dimension 182a.

The first clamp 300 may comprise an inwardly engaging surface 330 engaging with the first peripheral engaging surface 314 and the second peripheral engaging surface 324 to maintain the cartridge housing 112a and the cover plate 113a in a fixed rotational orientation when the first clamp 300 is in a narrow position (i.e., in a narrow position, the first clamp 300 may simultaneously engage both the first peripheral engaging surface 314 and the second peripheral engaging surface 324). For example, the first clamp 300 may comprise a V-band clamp for engaging the first and second peripheral engaging surfaces 314, 324. The inwardly engaging surface 330 may comprise one or more sets of opposing peripheral flanges 332. The first clamp 300 is illustrated in a narrow position—a position in which the first clamp would engage and retain the first lip 312 and the second lip 322 when the first clamp 300 is disposed about the first lip 312 and the second lip 322. Alternatively, the first clamp 300 may be positioned in a wide position (not illustrated) for positioning the first clamp 300 around the first lip 312 and the second lip 322 during the assembly process.

The design of the first clamp 300 together with the design of the cartridge housing 112a and the cover plate 113a enable the cartridge housing 112a and the cover plate 113a to be positioned at an infinite number of rotational orientations relative to one another. The designs illustrated in FIGS. 12-14 are merely illustrative and should not be imported into the claims. For example, different types of clamps 300 and lips 312, 322 may be employed within the scope of the disclosed subject matter to achieve a fixed rotational orientation between the cartridge housing 112a and the cover plate 113a.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order and are not meant to be limited to the specific order or hierarchy presented.

Various components disclosed herein may be made, for example, of stainless steel, ductile iron, cast-iron, or plain steel.

It should be noted that the components illustrated in the figures are merely examples of the claimed subject matter. For example, the shape of the turbine housing 114 and compressor housing 110 110a may be varied within the scope of the disclosed and claimed subject matter. Additionally, the configuration of the vane assemblies 144 may also be varied when within the scope of the disclosed and claimed subject matter. For example, the first and second wings 212, 214 of one or more vanes 210 may be of different non-symmetrical sizes or shapes. A guide pin 119, 149 may comprise, for example, a dowel or roll pin. As used herein, a "turbocharger component" comprises any subpart or set of subparts of a turbocharger, such as the portion of the turbocharger 100 illustrated in FIG. 4A or any other subpart of the turbocharger 100, 100a.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed.

What is claimed is:

1. A turbocharger or turbocharger component comprising a length dimension and a width dimension, the turbocharger comprising:
    an annular unison ring;
    a first nozzle ring having an outer annular nozzle ring surface, an annular groove, and an inner annular nozzle ring surface on a first side of the first nozzle ring, the annular groove comprising an outer circular wall, an inner circular wall, and a recessed annular surface, the recessed annular surface being offset from the outer annular nozzle ring surface along the length dimension, the recessed annular surface disposed intermediate the outer circular wall and the inner circular wall, the annular groove shaped and sized to receive the annular unison ring such that the annular unison ring is rotatably disposed in the annular groove;
    a plurality of vane apertures extending through the first nozzle ring from the inner annular nozzle ring surface to an opposite annular ring surface disposed on a second side of the first nozzle ring;
    a partial circular recess disposed in the outer annular nozzle ring surface and adjacent to the annular groove;
    a plurality of unison pins extending away from a first unison ring surface of the annular unison ring;
    a slot disposed in the annular unison ring;
    a plurality of vane assemblies, each vane assembly comprising a proximal shaft, a distal shaft, and a vane, the proximal shaft and the distal shaft extending along a common longitudinal axis with the vane disposed intermediate the proximal shaft and the distal shaft, each vane comprising a first wing and a second wing;
    a unison crank having a circular body having a first side and a second side, the first side of the unison crank being opposite the second side of the unison crank, a centrally located central pin extending from the first side of the unison crank, and an eccentric pin extending from the second side of the unison crank, the partial circular recess being shaped and sized to receive the circular body of the unison crank such that the unison crank is rotatably disposed in the partial circular recess, the eccentric pin being disposed in the slot such that rotation of the unison crank causes the annular unison ring to rotate within the annular groove;

the plurality of vane apertures being shaped and sized to receive one of the proximal shafts of the plurality of vane assemblies such that each vane assembly is rotatably disposed in a respective vane aperture about a respective common longitudinal axis; and a plurality of vane arms, each vane arm having a first end and a second end, each first end slidably attached to one of the plurality of unison pins of the annular unison ring, each second end fixedly attached to the proximal shaft of one of the vane assemblies such that rotation of the annular unison ring causes each of the plurality of vane arms to pivot and the vane assemblies to rotate about each respective common longitudinal axis.

2. The turbocharger or turbocharger component of claim 1, further comprising:

a second nozzle ring;

a turbine housing having a second annular groove comprising a second inner circular wall, a second outer circular wall, and a second recessed annular surface, the second recessed annular surface being disposed between the second inner circular wall and the second outer circular wall, the second annular groove sized and shaped to receive the second nozzle ring;

a plurality of fasteners disposed to removably fix the second nozzle ring at least partially within the second annular groove; and the second nozzle ring comprising a plurality of secondary vane apertures, each secondary vane aperture sized and shaped to receive one of the distal shafts of the plurality of vane assemblies such that each distal shaft is rotatably disposed in a respective secondary vane aperture with the plurality of vanes disposed between the first nozzle ring and the second nozzle ring, wherein the first nozzle ring is repositionable and fixable at different rotational orientations with respect to the second nozzle ring.

3. The turbocharger or turbocharger component of claim 2, further comprising a cover plate and a turbine housing, wherein the cover plate is repositionable and fixable at different rotational orientations with respect to the turbine housing.

4. The turbocharger or turbocharger component of claim 3, wherein the second nozzle ring is repositionable and fixable at different rotational orientations in the second annular groove.

5. The turbocharger or turbocharger component of claim 1, further comprising:

a second nozzle ring, the second nozzle ring comprises a plurality of secondary vane apertures, each secondary vane aperture sized and shaped to receive one of the distal shafts of the plurality of vane assemblies such that each distal shaft is rotatably disposed in a respective secondary vane aperture with the plurality of vanes disposed between the first nozzle ring and the second nozzle ring.

6. The turbocharger or turbocharger component of claim 5, wherein the second nozzle ring is integrally formed with a turbine housing.

7. The turbocharger or turbocharger component of claim 1, further comprising:

a cartridge housing comprising a first throat and a first lip disposed at a remote end of the first throat, the first lip having a greater width than the first throat, the first lip comprising a first peripheral engaging surface;

a cover plate securable to the first nozzle ring, the cover plate comprising a second throat and a second lip disposed at a remote end of the second throat, the second lip having a greater width than the first throat, the second lip comprising a second peripheral engaging surface; and a clamp comprising an inwardly engaging surface, the clamp having a narrow position, the inwardly engaging surface being shaped to simultaneously engage the first peripheral engaging surface and the second peripheral engaging surface to fix the first lip in an adjacent position with respect to the second lip in any rotational orientation of the cover plate with respect to the cartridge housing when the clamp is in the narrow position.

8. The turbocharger or turbocharger component of claim 1, further comprising:

a cartridge housing comprising a throat and a lip, the throat having a throat width, the lip being disposed at a remote end of the throat, the lip having a lip width, the lip width being greater than the throat width;

a cover plate securable to the first nozzle ring, the cover plate comprising an opening for receiving the lip, the opening having an opening width greater than or equal to the lip width; and one or more inwardly projecting brackets securable to the cover plate in a secured position in which opposing inward edges of the one or more inwardly projecting brackets define a bracket width, the bracket width being less than each of the opening width and the lip width and being greater or equal to the throat width.

* * * * *